(12) United States Patent
Enrique Salpico

(10) Patent No.: US 10,257,186 B2
(45) Date of Patent: Apr. 9, 2019

(54) METHOD AND NETWORK ELEMENT FOR IMPROVED ACCESS TO COMMUNICATION NETWORKS

(71) Applicant: TECTECO SECURITY SYSTEMS, S.L., Madrid (ES)

(72) Inventor: Jose Antonio Enrique Salpico, Madrid (ES)

(73) Assignee: TECTECO SECURITY SYSTEMS, S.L., Madrid (ES)

( * ) Notice: Subject to any disclaimer, the term of this patent is extended or adjusted under 35 U.S.C. 154(b) by 304 days.

(21) Appl. No.: 15/314,725

(22) PCT Filed: May 29, 2015

(86) PCT No.: PCT/ES2015/070423
§ 371 (c)(1),
(2) Date: Nov. 29, 2016

(87) PCT Pub. No.: WO2015/181431
PCT Pub. Date: Dec. 3, 2015

(65) Prior Publication Data
US 2017/0187703 A1    Jun. 29, 2017

(30) Foreign Application Priority Data

May 29, 2014    (ES) .................................. 201430822

(51) Int. Cl.
| | |
|---|---|
| *H04L 29/06* | (2006.01) |
| *G06F 21/44* | (2013.01) |
| *H04L 29/12* | (2006.01) |
| *G06F 17/30* | (2006.01) |
| *H04L 12/931* | (2013.01) |

(Continued)

(52) U.S. Cl.
CPC ...... *H04L 63/083* (2013.01); *G06F 17/30312* (2013.01); *G06F 21/44* (2013.01);
(Continued)

(58) Field of Classification Search
None
See application file for complete search history.

(56) References Cited

U.S. PATENT DOCUMENTS 6,393,484 B1 * 5/2002 Massarani ......... H04L 29/12018
709/225
7,568,092 B1   7/2009 Englund
(Continued)

FOREIGN PATENT DOCUMENTS

| EP | 2667664 A1 | 11/2013 |
|---|---|---|
| WO | 2005091159 A1 | 9/2005 |
| WO | 2006132819 A2 | 12/2006 |

*Primary Examiner* — Henry Tsang
(74) *Attorney, Agent, or Firm* — McNees Wallace & Nurick LLC

(57) ABSTRACT

The present invention proposes a method and network element which allows increasing, in different aspects, communications network protection in a single network element. This element will have the ability to manage and provide the mechanisms needed for communications, user and device protection without having to cooperate with end systems (i.e., in a transparent manner for said systems). The present invention proposes a new physical and logical architecture for said network element with various databases and verification and learning mechanisms, offering protection, management and automation abilities much greater than the systems existing today.

15 Claims, 8 Drawing Sheets

(51) Int. Cl.
*H04L 29/08* (2006.01)
*G06F 21/62* (2013.01)

(52) U.S. Cl.
CPC .... *G06F 21/6218* (2013.01); *H04L 29/06102* (2013.01); *H04L 29/06115* (2013.01); *H04L 29/06149* (2013.01); *H04L 29/08009* (2013.01); *H04L 29/08045* (2013.01); *H04L 49/20* (2013.01); *H04L 61/2015* (2013.01); *H04L 63/0236* (2013.01); *H04L 63/0876* (2013.01); *H04L 63/10* (2013.01); *H04L 63/101* (2013.01); *H04L 63/107* (2013.01); *H04L 63/145* (2013.01); *H04L 63/1416* (2013.01); *H04L 63/1458* (2013.01); *H04L 63/162* (2013.01); *H04L 63/20* (2013.01); *H04L 67/02* (2013.01); *H04L 61/6022* (2013.01); *H04L 69/324* (2013.01)

(56) References Cited

U.S. PATENT DOCUMENTS

| | | | |
|---|---|---|---|
| 7,574,202 | B1 | 8/2009 | Tsao et al. |
| 2003/0101338 | A1* | 5/2003 | Mullen ............... H04L 63/0236 713/152 |
| 2003/0220994 | A1 | 11/2003 | Zhu |
| 2005/0055570 | A1* | 3/2005 | Kwan ..................... H04L 63/08 726/4 |
| 2006/0137005 | A1 | 6/2006 | Park |
| 2007/0220252 | A1* | 9/2007 | Sinko ................... H04L 63/101 713/168 |
| 2008/0209071 | A1 | 8/2008 | Kubota |
| 2011/0055928 | A1 | 3/2011 | Brindza |
| 2011/0107436 | A1* | 5/2011 | Cholas ............... H04N 21/2541 726/29 |

* cited by examiner

FIG. 2

| RULES | ORIGIN | DESTINATION | SERVICE | ACTION |
|---|---|---|---|---|
| 1 | DEVICE 1<br>USER 1a | DEVICE 1 | SMB<br>TCP23<br>HTTP | |
| 2 | USER 1m | WWW.GOOGLE.COM | | |
| 3 | USER 1m | DISPOSITIVO 2 | SMB<br>TCP23<br>HTTP | |
| 4 | USER 1m | WWW.FACEBOOK.COM | | |
| 5 | ANY | ANY | ANY | |

SECURITY POLICIES

FIG. 4

METHOD AND NETWORK ELEMENT FOR IMPROVED ACCESS TO COMMUNICATION NETWORKS

TECHNICAL FIELD OF THE INVENTION

The present invention applies to the telecommunications sector and relates particularly to the access of equipment (devices) to a communications network. More specifically, the invention described in the present specification relates to a communications network access method and element (node) incorporating improved mechanisms (particularly for security).

BACKGROUND OF THE INVENTION

Different elements or mechanisms are known in the state of the art for controlling communications network access, these elements incorporate security techniques so that interconnection between the devices of a network is only for the users and devices authorized to access the same and under allowed conditions.

However, until now, none of these elements/mechanisms managing network access provide a global protection, i.e. it is currently impossible to confirm that there is an access control element or mechanism completely covering the needs of the user and of the connected devices, since all the existing elements/mechanisms have serious limitations and vulnerabilities, some of which will be described below.

Usually, the identification of authorized users is performed at layer 3 level of the OSI model by means of IP addresses or in higher layers. Therefore the elements responsible for controlling network access (and identifying the users) must have devices capable of interpreting data at least at level 3 and higher of the OSI model. Furthermore, identification based on IP addresses is insufficient for assuring the identification of a user since any user by means of any device can configure their IP address without needing to have thorough knowledge of the network, so IP addresses can be easily stolen.

A main element for providing connectivity between devices of a communications network is the router. Routers today have hardware limitations (lack of resources such as memories, processors, interfaces/ports needed for performing the tasks of the router . . . ), integration limitations and particularly security limitations since there is no integral security of the routers (for the different services it houses and the communications that pass therethrough). These limitations are to the detriment of the scalability, adaptability and reliability of the router in question.

Security limitations are those vulnerabilities currently detected in the different protocols or standards supported by a router device. These vulnerabilities feed off the weaknesses of the protocols and elements used for establishing trustworthy communications environments. The security layers established by the protocols are destroyed with the so-called network attacks usually in order to obtain the following results: capturing packets in the data network (sniffers), identity theft (spoofing), Man In the Middle or Denial-of-Service (DoS), for example.

Thus, for example, in WIFI networks, FMS attacks (it attempts to break by force the cryptographic protocol RC4 on which the WEP protocol, Wired Equivalent Privacy, is based), Chop-Chop (through which a packet is injected changing the last byte attempting to decipher this value), fragmentation, WPS (Wifi Protected Setup, this function, under the IEEE 802.11i standards, is used for accepting and linking new clients in wireless networks without having to enter the actual cryptographic passwords of the WiFi protection protocol, which entails exposing the router to identity theft attacks), can occur among others.

In Ethernet networks there are protection mechanisms based on the network identifier of the devices connected to the router. The router denies or allows communications between the communication ends based on rules based in turn on the identifier of the network. The decision to interrupt the connection is never taken based on the physical link and therefore it discriminates protection situations against Denial-of-Service attacks or a fraudulent use of the device.

In IPV6 networks, attacks of router advertising, DNSv6 spoofing or packet fragmentation attacks can occur among others. In turn, in WAN networks some of the main problems that arise can be concerning antimalware protection (the routers are mainly software systems that can be affected by malware for the control and unlawful use of the device and there are critical vulnerabilities that allow intruders to take control of many of the routers that give access to Internet) and flow label (the flow label serves for providing differentiated processing for data flows that pass through a network by means of IPv6, this can be used by competitors and malicious people for injecting packets with fake IPv6 addresses or falsified flow labels. This is possible because the headers of the packets that pass through the intermediate nodes are not verified, so there is no assurance that this data is trustworthy and the network simply assumes that the date is trustworthy).

The DHCP protocol (Dynamic Host Configuration Protocol) is widely used in the state of the art for configuring equipment connected by a communications network. Despite all the useful functions offered by the DHCP protocol, there are various very negative aspects when using this system, mainly security aspects. Some of these security problems can be:

Malicious server: The automation of the DHCP protocol is a great security risk allowing a malicious DHCP server to be introduced into a network, which can intercept the information sent by a user connected to the server.

Universalization of the DHCP protocol: Since most of routers and switches have the DHCP protocol implemented therein, any user wishing to access the network can have easy access thereto using said protocol.

Multiple subnetworks or network segments: There are environments where each network segment may need its own DHCP server, or a DHCP relay agent (which requires additional configuration, entailing additional time and highly increased costs). If no option is viable, all the network elements must be configured as emitters of the BOOTP protocol, which is an older and less advanced protocol than the DHCP protocol (with the resulting problems) and furthermore not all the systems can support said protocol.

Control of information flows: The DHCP server often uses ports 67 and 68 through UDP for receiving and sending data to the clients. Said flows can be controlled by a firewall, but this does not rule out those network intruders that can capture the packets related to said sensitive information which can be used for passing oneself off as a client. Currently, the only mechanism offering control for this type of intrusion would be the integration of an IDS or intruder detector, with the subsequent cost and which in some cases is not worthwhile due to the size and shape of the network.

Firewalls are the most widely used elements for establishing security and they are based on the fact that all the incoming or outgoing traffic of a network must pass through them, and they impose a series of security policy filtering. However, these elements are far from being the final solution to the security problems since they have various vulnerabilities.

The greatest limitation of a firewall is the security gaps they leave and which an intruder can find out. Firewalls are not smart systems, they act according to parameters entered by the designer and the administrator, if an information packet is not within these parameters as a risk threat, they simply let it pass through. It is even more dangerous when the intruder leaves back doors which open a different gap and delete the evidence or signs of the original attack.

Another limitation of the firewall is that if an intruder successfully enters the organization and finds out the password or the gaps of the firewall and spreads this information, the firewall will not be aware of that. Furthermore, firewalls only protect networks and devices, but they do not protect users or physical people. The firewall does not provide tools against filtration of software or virus-infected files either, although it is possible to provide the system where the firewall is housed with a suitable antivirus.

Furthermore, firewalls do not protect people inside the network and do not act suitably against techniques such as social engineering and insider attack.

On the other hand, there are authentication or NAS (Network Access Servers) servers or systems which are access network servers at the initial point of entry to a network for most of the users of network services. It is the first device in the network providing services to the final user and acts as an entry door for all additional services, applying certain policies for authenticating the users who wish to access the network. Some of the authentication systems that are widely used today include KERBEROS, RADIUS or TACATS, for example. However, all the authentication systems existing today have serious limitations.

In summary, it can be said that all the elements and mechanisms forming part of the network access security (for example, routers, switches, firewalls, authentication systems, antivirus) have serious security limitations and vulnerabilities. Furthermore, most of these elements/mechanisms have not evolved at all in the last decade (at least not from the viewpoint of managing and improving security). There is therefore the need to provide a global and effective solution completely covering the current needs of the user and of the devices of the network, not having the limitations and vulnerabilities of the access elements/mechanisms existing today.

BRIEF DESCRIPTION OF THE INVENTION

The present method and device solve the problems of the solutions of the state of the art, proposing an improved communications network access mechanism. An element managing the access in the communications network (for example, a router) will have a new physical and logical architecture expanding the ability of said element with greater protection for the communications network to which it gives access. This element will have the ability for managing and providing the mechanisms needed for protecting the incoming and outgoing communications of the network, users and devices.

To that end, in a first aspect the present invention proposes a process or method for the improved access of a user in a communications network using an electronic device, where the method comprises the following steps performed in a network element:

a) receiving from the electronic device a network access request message including an identifier of the device;

b) if said identifier of the device is in an internal database of the network element as an identifier of a denied device (it is in the table of denied devices of said internal base), denying network access to said device, otherwise, proceeding to step c);

c) if the identifier of the device is registered in the database as an identifier of a device allowed to access the network (it is in the table of authorized devices of said internal base), proceeding to step d) and, otherwise, storing the identification of the device in the internal database as an unauthorized device, denying network access to said device;

d) receiving from the electronic device (e.g. after request from the network element to the device) an identifier of the user and a password for said user;

e) if said identifier of the user is in the database as an identifier of a denied user (it is in the table of denied users of said internal base), denying said device's network access and ending the method, otherwise, proceeding to step f);

f) authenticating the user, performing at least the following verifications:
   f1) verifying that the identifier of the user is in the database as an identifier of an authorized user (or a registered user, i.e., it is in the table of user and password control) and if the received password corresponds to the one linked (assigned) to said user in the database;
   f2) verifying that the identifier of the device is in the database as linked to said user;

g) if all the verifications of all the authentication steps are positive (the user verification, password verification, linking verification and, if applicable, time of access verification, security policy verification, verification of a web page allowed by the semantic analyzer . . . ), providing (allowing) network access, otherwise, storing the identification of the user in the internal database as an unauthorized user and denying said user's network access;

h) if a layer 2 message requesting network configuration parameters (usually this message will also include the identifier of the device) is received from the device, an additional optional security measure has the possibility of verifying once more at this point whether the device is registered in the database as a device allowed to access the network and, otherwise, storing the identification of the device as an unauthorized device and denying network access (and not proceeding to step i).

i) assigning a set of network configuration parameters to the device depending at least on the identifier of the device and sending said set of network configuration parameters to the device (said set of network configuration parameters includes a network (IP) address for the device, where said network address belongs to a range of network addresses available for the device, depending on the identifier of the device).

Denial of network access (based on the network access requested by the device/user) can be explicit (by means of a layer 2 message to the device notifying the denial) or implicit (without message notifying the denial). In both cases, it implies that the network element does not allow the requested network access (or does not perform the actions needed for providing network access) to the device (and user) or, i.e., the packets sent by the device will be blocked in the router (and will not reach the network or will not exit the network if this is outgoing traffic thereof). And, obviously, if a point is reached where network access is denied, the remaining verifications and steps of the method are not performed.

All the previously described communications between the device and the router are performed by means of layer 2 messages of the OSI model; or, i.e., the described access control is performed in the layer 2 (data link layer) of the OSI model.

Step d) can include: when a layer 2 message including a network access request and an identifier of the device is received from the electronic device, sending to the device a layer 2 message requesting an identifier of the user and a password for said user and receiving from the device a layer 2 message including a user identifier and the password for said user.

In one embodiment, where the user authentication step further comprises the following authentication steps after step f2) and before step g):

f3) obtaining the time (and optionally the date) when the access (the access request) is taking place and verifying that said time (and/or date) is within the allowed times of access for said user and/or for said device stored in the internal database (for example, if the access takes place outside the allowed times of access or allowed times of access for said user are not in the internal database, the verification would be negative) and/or f4) verifying that the network access requested by the user is allowed by the security policies (416) defined for said user stored in the internal database;

An NTP service can be used for obtaining the date and time for performing step f3) or for other functions (for example, knowing the current user's age from his date of birth).

In one embodiment, if the user is underage the following actions are performed after step f2):

classifying the user in a given category according to the user's age;

verifying if the web page which the user wishes to access (if he wishes to access any web page according to the access request) is classified as accessible for said category in which the user has been classified, where in order to classify a web page as accessible depending on the user's age an analysis of the semantic content of said web page is performed. If it is classified as non-accessible, denying access (to said web page). At the external database level, there will be a content classification system or service module which is responsible for feeding the content of the web pages it must analyze to the semantic analyzer.

In one embodiment, step i) comprises:

i1) assigning a second access profile obtained from the database to the device depending on the identifier of said device;

i2) assigning a set of network configuration parameters to the device depending on the second access profile assigned thereto, said set of network configuration parameters including a network address for the device; said assigned network address can grant restricted network access, depending on the range of network addresses to which said assigned address belongs;

i3) sending a layer 2 message to the device with the network configuration parameters assigned to the device.

The restricted network access can comprise at least one of the following restrictions:
denying sending data to device;
denying communication with the rest of the network devices;
denying accessing at least one port;
denying communication by means of at least one protocol;
authorizing only Internet access;
accessing the network within a given time period.

If the antivirus information of the device has changed, the second profile assigned to the device and, therefore, the range of network addresses available thereto can be changed. For example, if the device is now infected with a virus or the antivirus version installed in the device is no longer correct, a more restrictive profile will be assigned thereto and if the device is no longer infected with a virus or the antivirus version installed in the device is now correct, a less restrictive profile will be assigned thereto. Optionally, if the device is now infected with a virus or the antivirus version installed in the device is no longer correct, the network access is denied to the device.

Step i2) can comprise:

i21) obtaining from the database, depending on the second access profile assigned thereto, a set of network configuration parameters available for the device, said parameters including a range of network addresses available for the device;

i22) sending a layer 2 message to the device, including said network configuration parameters available for the device;

i23) receiving from the device a layer 2 message, with the configuration parameters chosen by the device from among the available network configuration parameters sent in step i22, where said chosen configuration parameters include a network address of the set of network addresses available for the device and assigning to the device the chosen configuration parameters received in step.

In one embodiment, the method further comprises:

j) periodically obtaining the location of the network element;

k) comparing said location with the previously obtained location (or with a range of allowed locations) and if it does not coincide, blocking the network element's network access.

l) periodically obtaining the location of the device, comparing said location with a range of allowed locations and if it does not coincide, denying the device's network access, and, optionally, adding the location of the device to all the packets coming from the device.

Optionally, the location of the network element can be added to all the packets coming from any electronic device accessing the network through the network element.

In one embodiment, for allowing network access (for the first time, i.e., when being registered in the network), the network element asks user information from the user and if the user does not provide said information, the network element denies network access; where this user information includes at least one of the following parameters: full name of the user, mailing address, ID number, passport number, date of birth and all the information concerning the user found in the internal database, the network element sends said information to a worldwide external database (for worldwide user management, synchronization and control). This information can be sent through an external communications network (for example, the Internet).

The messages received from and sent to the device in step i) can be broadcasting messages, using a layer 2 broadcasting address of the network.

In a second aspect, the present invention proposes a network element (a router, switch, firewall or splitter or any other network element belonging to the communications network and managing communications network access) for improved access of a user to a communications network using an electronic device, where the network element comprises:
- a database comprising:
  - a table of identifiers of devices with denied network access and a table of identifiers of users with denied network access, a table of identifiers of authorized users including the password linked to each user, a table of identifiers of those devices having authorized network access, a table of identifiers of the user that are linked to each identifier of the device with authorized network access and a table with the set of network configuration parameters available for each identifier of the device with authorized network access, where the set of available network configuration parameters comprises a range of network addresses available for each profile;
- means for receiving from the device a network access request, an identifier of the device, an identifier of the user, a password for said user
- means for receiving from the device a layer 2 message, requesting network configuration parameters for accessing the network;
- a processor configured for:
  - verifying if said identifier of the device is in the table (log) of devices with denied network access and, if so, denying said device's network access;
  - verifying if the identifier of the device is registered in the table of identifiers of those devices having authorized network access, if the verification is negative, denying network access and storing the identification of the device in the table of devices with denied network access;
  - verifying if said identifier of the user is in the table of users with denied network access and, if so, denying said device's network access;
  - authenticating the user, performing at least the following verifications:
    - verifying that the identifier of the user is in the table of authorized users and the received password corresponds to the one linked to said user in said table;
    - verifying that the identifier of the device is in the database as linked to said user;
  - if any of the authentication verifications is negative, storing the identification of the user in the table of users with denied network access and denying said user's network access;
  - when receiving from the device the message requesting network configuration parameters, verifying if the identifier of the device is registered in the table of identifiers of those devices having authorized network access, if the verification is negative, storing the identification of the device in the table of devices with denied network access and denying said device's network access and, if the verification is positive, assigning a set of network configuration parameters to the device depending at least on the identifier of the device;
- means for sending a layer 2 message to the device with the network configuration parameters assigned to the device.

Finally, a fourth aspect of the invention relates to a computer program comprising computer executable instructions for implementing the described method, when being run in a computer, a digital signal processor, an application-specific integrated circuit, a microprocessor, a microcontroller or any other form of programmable hardware. Said instructions can be stored in a digital data storage medium.

Additional, specific and preferred aspects, embodiments and details of the invention are stated in the attached independent and dependent claims. For a more complete understanding of the invention, its objects and advantages, reference can be made to the following specification and to the attached drawings.

DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character:

FIG. 2 schematically shows a possible example of a table of user and password control according to one embodiment of the present invention.

FIG. 4 schematically shows a possible example of security policy table according to one embodiment of the present invention.

DETAILED DESCRIPTION OF THE INVENTION

Figure 1:
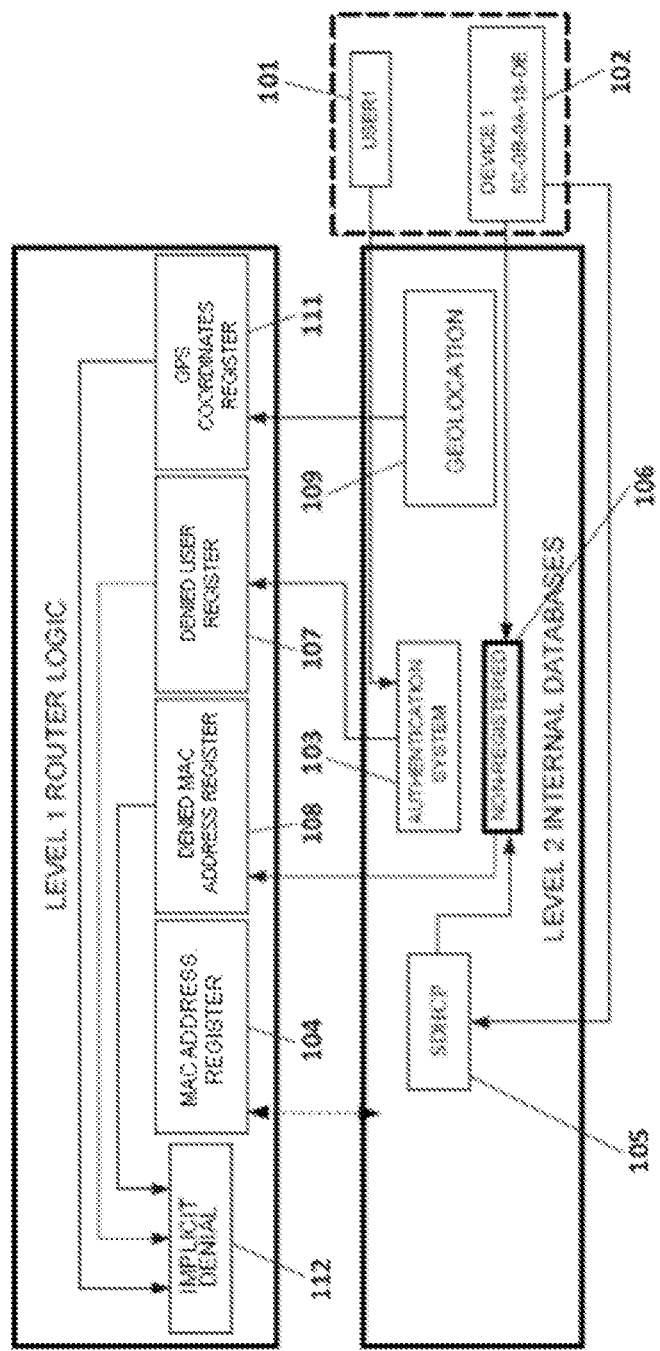
FIG. 1 shows a schematic diagram of the implicit denial operation in several scenarios according to one embodiment of the present invention.

The present invention proposes an improved communications network access mechanism. The main element of this mechanism will be a network element (also referred to as a network node or network device) managing communications network access (incoming or outgoing). This network element can be a router, although in other embodiments it can be another type of network element such as a switch acting on the layer 2 of the OSI model or another type of nodes managing network access in some way, for example. The present invention proposes a new physical and logical architecture for said network element (which will be programmable in a distributed manner, i.e., made up of several hardware and software components, for facilitating implementation, scalability and extensibility), which will expand the ability of said element with greater protection for the communications network to which it gives access. This element will be able to manage and provide the mechanisms needed for communications, user and device protection without cooperating with end systems (i.e., in a transparent manner for said end systems).

The devices wishing to access the network can be computers, tablets, PCs, cell phones, smartphones, laptops and generally any equipment or electronic device that can be connected to a communications network.

The communications network (e.g., a data network) can be of any type both from the viewpoint of its structure (it can be a local area network, LAN, a wide area network, WAN, or any other type of network) and of the communication technology it uses (it can be wired network, a WIFI network, a mobile telephony network or it can use any other type of communications technology). It can also be a private or public network. It will usually work under the OSI model (Open System Interconnection) and TCP/IP stack.

This new global access system presents important challenges for achieving a coordinated behavior between the network element (for example, the router), the device or equipment wishing to access the network and the user in terms of security and protection of each of them. To that end, several router, device and user communication mechanisms are proposed. The development of the mechanism for controlling and managing security at an individual level of the user who accesses the network, which can be physical person or an object (in the field of "Internet of Things" or IoT) defines an open interface between the control plane and the data plane of the router.

This network element (router) will control access to a communications network (for example, a LAN), both incoming and outgoing. In other words, it will control access from a network (for example, the Internet) or equipment (device) external to the communications network, which attempts to access the communications network or from an equipment which is in the communications network and attempts to communicate with another equipment of the network or with a network external to the communications network. In other words, it controls the use of the communications network for communication with devices or services within or outside the network.

To that end, a resource model for the network element is defined and the functionalities of each of the components are identified. A trust hierarchy is established in three levels of the network element, level 1 being the highest level. Each security level is made up of mechanisms, protocols and dynamic or static tables, these tables work independently, but they are all synchronized with one another, thereby achieving a high coordination and security level. These levels are: level 1 (router logic, also referred to as implicit denial), level 2 (internal database) and level 3 (external database, also referred to as external access database). These hierarchical levels are defined in the network element for better specifying its operation, but they must not be mistaken with the layers of the OSI model.

The three security levels are synchronized with one another, but level 3 will not be able to access the database of levels 1 and 2. It has been developed like that because level 1 has data that is exposed to the outside (Internet) and in order to increase security, access to levels 1 and 2 is denied. In other words, levels 1 and 2 have access to the remaining levels, but level 3 has no access to the data of levels 1 and 2.

Level 1: Router Logic (Implicit Denial)

This level encompasses the mechanisms for denying devices, users and services, referred to as implicit denial. Implicit denial is the mechanism through which the developed security mechanism or system denies access to any device or user (physical person) not registered in the internal database (DB) (of level 2), by the router not responding to the broadcasting messages coming from a user or equipment, the access of which has been denied (because it is not in the internal database of the router); this makes the router invisible to any element or device which is not on the list of trustworthy elements, (i.e., in the internal database). It is an implicit mechanism due to the fact that there is no specific expression or configuration of the system. This mechanism grants the equipment intelligence since it is able to make decisions without having to interact with humans.

The router logic automatically generates the fields needed for applying a secure configuration, this means that the register fields are automatically generated with the existing information and traffic in the network, provided by the authentication system, the dynamic host configuration protocol and the geolocation system, therefore human interlocution is not essential. To that end, the router registers the activity of all the services, systems, devices and users wishing to access the network and, in general, of the incoming and outgoing communications of the network and decides whether it allows them or not. Furthermore, based on this activity log (or register), tables are generated in the bins making up the router logic. Thus, for example, when a user wishes to access the network and is not registered, this activity is registered in the "DENIED USERS REGISTER" bin, in contrast, if it is a device that is not registered, the activity of this device is registered in the "NOT ALLOWED MAC ADDRESS REGISTER" bin. The system administrator will periodically receive the information needed for managing the router logic. In other words, the network administrator receives all the information generated by level 1 of the router logic and is the one deciding what to do with said information (if any action needs to be performed based on said information). For example; when a user forgot his password or it just expired, this activity is registered in the "DENIED USERS REGISTER" bin and the administrator will be notified that the denied user has been denied access because the password of said user has expired, the administrator can then grant the user a new password in this case, for being able to access the network.

Implicit denial is a completely automatic defense mechanism protecting the router against denial-of-service attacks. Implicit rules are a set of predefined rules for greater protection. These rules denied access of users and devices that have been denied, for example, by the authentication system, by the SDHCP protocol (Secure Dynamic Host Configuration Protocol) and by the geolocation system as described below. In other words, it feeds off the information provided by the authentication system with the users not having network access, with those denied by the SDHCP protocol and with the geolocation system which are not registered in the DB. Based on the information received from and sent to the resgister tables, the field of rules within the implicit denial will decide if the user or device has to be eliminated from the protection system (i.e., access is denied thereto).

The rules making up the implicit denial decide:
Temporally or permanently denying user's access.
Temporally or permanently denying device's access.
Automatically and physically closing the ports of the router to the devices which have been permanently denied (automatically reopening the ports of the router for the devices that are registered).
Denying the devices' access (and the network element's access) if they do not meet the geolocation regulations.

Implicit denial is not applied until the first configuration of the network element (for example, the router) has been performed, once this first configuration is performed, the system will apply it by default according to the configuration parameters of the system administrator.

One of the advantages of this implicit denial mechanism is that it prevents denial-of-service attacks; the objective of these attacks is to block the access to the network services and resources for a given period and accessing the network in a non-allowed manner. One of these attacks is the saturation attack, wherein a very high number of requests is deliberately sent from one or more (malicious) devices to a network element (router, switch . . . ) so the element is saturated and is incapable of responding to the real requests (i.e., requests from real user devices wishing to access the network). Furthermore, when saturated, the equipment receiving the attack usually restarts and this is when the attacking device can access it and/or the network. Using the mechanism proposed by the present invention, denial by default applied in the low layer of the network element under attack (for example, a router) prevents such attacks, since the router denies access of all the devices not registered in its internal database. In other words, using the proposed mechanism, if the router receives a request from a device or user that has already been denied access previously, the router does not even respond with a denial but rather ignores the message. The result is that no matter how many messages the router receives from a device (in an attempt to saturate it), since it ignores them, the router will not be saturated and will not restart, such that the attack will not be successful.

This implicit denial mechanism is based on at least four tables (also called logs or registers), such as the MAC address register, the denied MAC address register, the denied users register and the geolocation register (also referred to as GPS coordinates).

MAC address register (104) (also referred to as authorized or allowed MAC address register or authorized or allowed device register):

It stores the identifier (usually the MAC address, although it can be another identifier such as IMEI, MSISDN, IMSI, LTE_ID . . . ) of the devices (equipment) that are allowed to access the network. If the identifier of the device is not in this table, it will considered that the device does not belong to the network (it is not allowed to access the network).

In addition to the main identifier (e.g., the MAC address of the equipment), this log can contain other identifications of the device (such as IMEI, IMSI, MSISDN or any other parameter identifying the device), i.e., it stores not only the main identifier of the authorized equipment but also one or more of these other identifiers. In certain scenarios, instead of the MAC address, the device can send one of these other identifiers; in those cases the table will be verified in the same way but starting from this identifier of the device instead of the MAC address of the device.

This log is in the internal database and therefore it can be said to belong to level 2 of security of the device (although it is accessible from level 1).

In this register the identifiers of any device that the router considers to have authorized network access (for example, because it is in other registers as authorized, as will be seen below) are automatically registered. The network administrator can in turn enter in this table the identifiers of the devices that he considers must have authorized network access (this can be done before starting the router or during its operation). This register allows opening all the ports of the router. All the devices that are correctly registered in this table have the ability to open the physical ports of the router that are closed, if they are in this log, without interacting with the router (i.e., without having to request the router to open them).

As described below, when a device that is not registered in the database attempts to access the network, the router registers it in the "DENIED MAC ADDRESS REGISTER". When said device attempts to access more than a given number of times (for example, three times), the implicit denial mechanism closes the port through which it wants to physically access because it understands that it is under attack by this device. For physically closing the port, it uses for example the command "port ETH1 shutdown", assuming that the port to be closed is the port ETH1. When a trustworthy device (i.e., a device that is registered in this allowed MAC addresses) wants to access the network through the closed port (ETH1), the implicit denial system, when detecting current in the port, verifies the MAC address of the device and automatically opens the port with the command "set policy ide mac xx.xx.xx.xx port not shutdown". This action is performed automatically by the Implicit Denial since it feeds off the information generated by the router, i.e., when the MAC address is not registered (and it attempts to access the network more than a given number of times), the router automatically performs the closing command and, in contrast, if the MAC address is registered the router automatically performs the opening command.

Denied MAC addresses register (108):

In this field, the identifier (usually the MAC address, hence its name, although it can be another identifier such as IMEI, MSISDN, IMSI, LTE, ID . . . ) of all the user equipments (devices) the network identifiers of which are not registered as authorized in the internal DB and/or have been rejected by the SDHCP protocol (as described below) are automatically registered. In other words, when an access attempt is received from an user device, it is verified whether or not its MAC address (or another identifier) is registered in the internal database as authorized. If not, it will automatically be registered as denied in this register. Likewise, when a network access request is received from user equipment and it is denied by means of the SDHCP protocol (as described below), then said equipment will also be registered as denied in this register. When an access attempt or an access request is received from a device that is in this table of denied devices (denied MAC addresses), the router will automatically deny the device's access by means of implicit denial (i.e., it will not respond to the device to allow access, and the device will not be able to access the network).

FIG. 1 shows the level 1 operation and methodology and the implicit denial in several network access denial scenarios/situations.

The scenario in which the MAC address of the device is not registered (and the user does not previously request assigning an IP address, using for example the SDHCP protocol) will be described now:

In one scenario, for example, the equipment or device 1 (102) belongs to a user (with high knowledge of the networks) who does not need to request the network configuration parameters from the SDHCP protocol in order to access the network, so the user manually assigns its network parameters (IP address, network mask and gateway). Once the user accesses the network, the router will verify the MAC address of the device and once the verification is performed it will check that the MAC of the device is not registered (106) in the internal DB, access is not allowed and the router will automatically send the MAC address information to the table of denied MAC address register (108), and the device will not be able to access the network the next time either, because it will be automatically rejected by the implicit denial mechanism (112).

In other words, when a device attempts to access the network, a double verification is performed. First, whether or not it is registered in the denied MAC address register is verified. If so, the access will not be responded to nor processed, so it will not be able to access the network (implicit denial). If it is not in this register, whether or not it is in the authorized MAC address register is verified. If not, then the identifier will be registered in the denied MAC address register and access will be denied. This first access denial, i.e., when the device is not in the denied device log but it is not in the authorized device log either, can be an implicit denial (i.e., the device is not responded to and is not allowed access) or an explicit denial (a message is sent to the device informing it that access is denied).

For greater security, in one embodiment, when the device attempts to access the network more than a number of times, the router automatically considers that the network is being threatened and physically closes the port (for example, by means of the instruction "port ethel shutdown"). Once the system has physically and permanently closed the port, it will only be able to automatically open the port when a device registered in the DB (for example, by means of the instruction "port eth1 no shutdown 68:76:4F:BF:6A:0F") accesses it, i.e., all the devices registered in the internal DB (in the authorized MAC address log) will have the ability to automatically open the ports.

This port opening and/or closing policy is automatically generated by the router from the information received from the internal databases. In other words, if, for example, the MAC address "YYY" is authorized according to the internal database, the router can generate a port opening policy which is "router#1 set police id mac YYY ports no shutdown" and thus the port will be open and enabled for the device having said MAC address when it accesses the network. A similar instruction will exist for all the MAC addresses that are in the table of authorized MAC addresses.

Something similar happens when assigning of IP address is previously requested using, for example, the SDHCP protocol and the MAC address is not registered. The device 1 (102) requests the network configuration parameters, this request is received by the SDHCP server (105) which can be the router itself. In application of the SDHCP protocol, the router performs the necessary verifications and verifies that the device is not registered (106) in the DB, and will send the MAC address information to the table of denied MAC address register (108). Once the MAC address is in this register, the next time the device requests the network parameters from the SDHCP protocol, the router will check that the MAC address of the device is in the denied MAC address log and this request will be rejected by the implicit denial system (112).

Once the router has registered the user in the denied MAC address register when said device requests access to the network again, this request will not reach the SDHCP system since the request is denied by the implicit denial system.

Denied Users Register (107):

In this table (or register), all the users who are not registered in the internal DB or who have been denied by the authentication system are automatically registered. When an access attempt is received from a user who is in this table, the router will already automatically deny access by means of implicit denial (i.e., it does not respond to the device so the device will not be able to access the network).

FIG. 1 also shows the level 1 operation and methodology and the implicit denial, with a non-registered user.

The user 1 (101) requests access to the network, the authentication system (103) performs the necessary verifications (which will be described below) and verifies that the authentication is negative, so the authentication system sends the user information to the table of denied user logs (107) which is in level 1 of the security layer. The information is stored in said table for a predetermined period of time, this time can be configured by the administrator.

Once the user has been registered in the table of denied users, when said user requests access to the network again, this request will not reach the authentication system because the request is denied by the implicit denial system (112).

Once the user 1 is not in the table of denied users, the user 1 will be able to request access to the network from the authentication system.

There are two ways in which a user 1 may not be in the table of denied users even though he has previously been denied access:

Because the system has deleted the data from the table; in this case if the user 1 is still not registered in the DB, it will return automatically to the table.

Because the system administrator has explicitly authorized the user. In this case, if the administrator has previously authorized access, the user 1 will automatically be taken out of the table if it was registered therein. The same can happen with the device that will be deleted from the table of denied MAC addresses if the network administrator has authorized access.

Geolocation register (referred to as GPS coordinates register if this geolocation system is being used):

It automatically registers all the devices not meeting the geolocation location regulation. This means that the proposed mechanism can define a list of authorized locations (coordinates) for the router (and/or for the devices accessing the router) and if it is not in that list or range of coordinates, access is denied. This is useful, for example, in digital platforms providing audiovisual content services, since it allows providing service only to devices that are in certain locations (for example, it will not provide service to devices accessing from outside the country to which the platform belongs).

FIG. 1 also shows the level 1 operation and methodology and the implicit denial, when the router has been changed to a non-authorized location. When the router (or the device) has changed location and it is outside the ranges of the initially established coordinates, the geolocation system (109) registers the new coordinates of the new location (111) and sends the new coordinates to the implicit denial bin (112). When verifying that the coordinates are not the ones that it initially established (or are outside a range of allowed locations), it will block the router and the router will not be able to access the network (for example, the audiovisual contents).

This block can be partial, i.e., for example, the router will only be blocked for a certain type of content (for example, audiovisual or multimedia content, so it will not be able to access the digital platforms), but a user or device who wishes to access the network can do so. However, if a user and a device of the network wishes to access a specific site or service with a position label (geolocation credentials, which can be the position of the router or the exact position of the device) that are not those allowed, it may not be able to access since at the time of establishing the communication the correct authorized location will not be sent. For example, a device in a bank office wishes to access the resources in the cloud (for example Google), where a security policy can exist stating that the allowed access coordinates for that office are XXX (with these coordinates the office will have access to the network). If the branch changes location, the coordinates will not be the same and will not be able to access the Google services.

For locating the network element and/or the devices, any known geolocation system such as GPS geolocation, IP address geolocation (either from the provider or from an independent client), mobile network geolocation (origin cell ID), assisted GPS, E-OTD, TOA, multipath fingerprint, received signal strength . . . ) or any other type of system that allows obtaining the location of a device, can be used.

Level 2: Internal Database

This level encompasses the control and authentication mechanisms that cause the resources and services of the network to have a better control, coordination and protection. To that end, a series of tables (or registers) that are stored in one (or more) internal database of the router is used.

These mechanisms can comprise an authentication mechanism (or system), a secure dynamic host configuration mechanism (or protocol) (SDHCP), an antivirus mechanism and a geolocation mechanism, which usually act in that order, although another order is possible.

Authentication:

The implementation of an authentication system in the network element (e.g., router) minimizes the existing and future vulnerabilities and does not require any cooperation with the end systems.

The information of all the users that are registered and their respective passwords in the router is stored in a table in the internal database known as user and password control (also referred to as user authorization table). Specific data of the person creating said user, which allows identifying the real person behind that username (such as mailing address, telephone, ID number, passport, date of birth . . . ) can be stored in this table. It also allows establishing predetermined groups, i.e., users can be put in groups. Another important novelty is that the nick or subusers of the different services on the Internet can be added to the user created by network administrator, and can be linked to the generated user (to specific personal data of the person creating said user such as mailing address, telephone, ID number, passport . . . ). This method provides a greater security both inside and outside the network, since the nick associated with the user of the system can be traced, thereby finding out the real person behind that nick or username. The nick or username will not be able to be duplicated in any case in order to prevent identity thefts.

The first linking is done manually, i.e., when the users are created (for example, by the system administrator) third party services used by said users will be linked to them and in turn to the registered user devices that they use to access the network. Once the user generates traffic, this linking can be done and changed automatically by the system. To that end, the system performs mathematical calculations and a series of predictions based on the information that the user himself generates such that different services, devices with which he communicates . . . can be linked to one user. This linking can also be predefined in the tables or be changed at any time by the network administrator.

Figure 2:
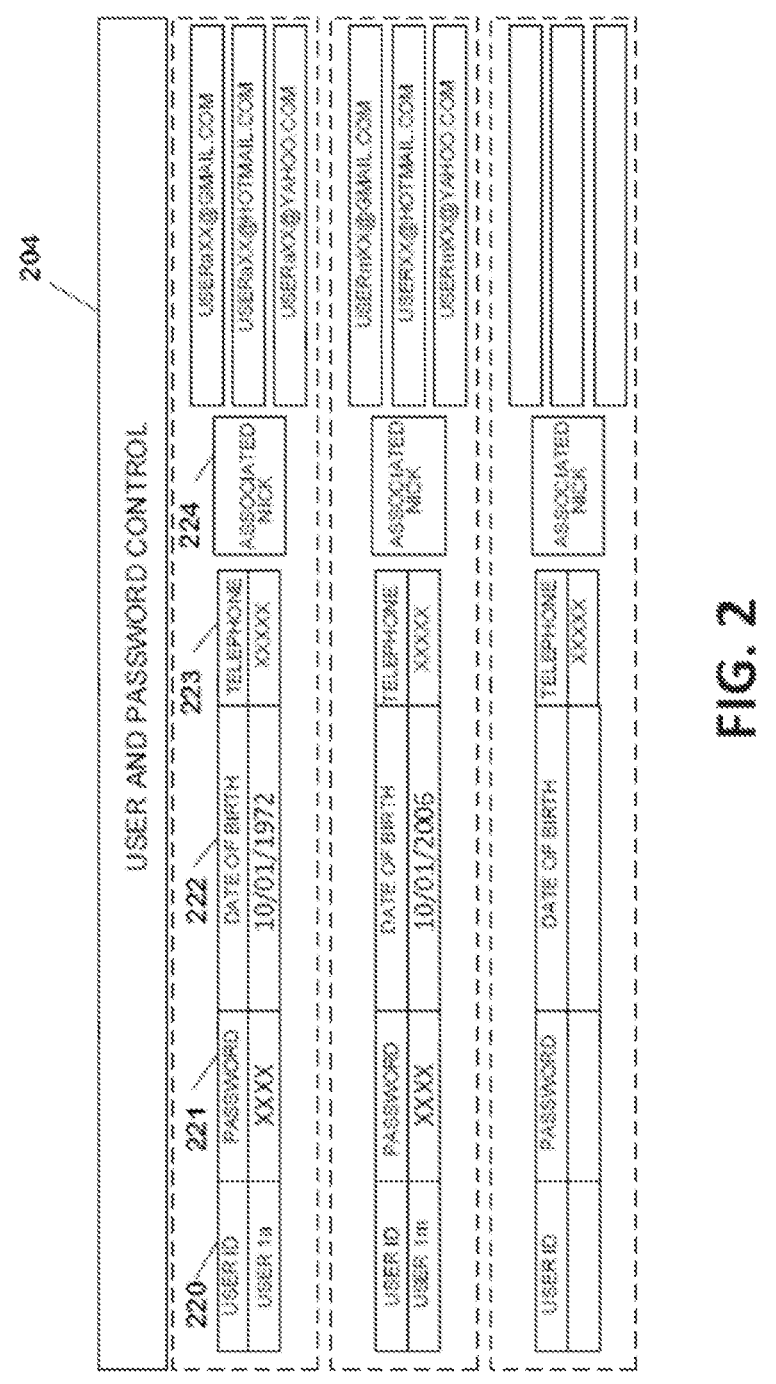

FIG. 2 shows an example of the table of user and password control (204) of the internal database. Obviously, the fields appearing in said table are just an example and other type of fields can be used.

The fields of this table are filled in when the user is registered in the network (for the first time) or when for any reason, the user wants to change some of these data, for example. The identifier of the users having authorized access to the communications network is added in the field user ID (220) (identifier of user). A password (221) will be added for each user. The password usually has a limited validity period (for example, 90 days) and after that time the user has to change the password, if for any reason the user does not change the password he may not have access to the network. Once the password has been registered, in one embodiment the next step is to complete the field of date (or year) of birth (222), this field "date of birth" is an innovation in and on itself since this field identifies the user's age and depending on this age the system will automatically add the user to the corresponding profile, i.e., if the user is of legal age (FIG. 2, user 1a), he will be assigned one of the profiles for adults or standard profiles, but if on the contrary the user is underage (FIG. 2, user 1m), he can be automatically assigned a parental control profile based on the user's age. In order to do so, the table can directly communicate with a service such as the network time protocol (NTP) housed in the external database, for example, and it verifies the user's age with the current date. Furthermore, other information about each user such as mailing address, telephone (223), ID number, passport no. and any other datum characterizing the real or "physical" user can be added. Mail accounts, nicks (224) used in social networks, videogame accounts (XBOX live and PlayStation) or other services used by the user can also be linked.

When the user wishes to access the network, he sends a network access request message to the router and the router requests the password (and the identifier of the user if it did not receive it in the first message) from the device (and the device from the user, by means of a user interface). The router will verify if the user is in this table of user and password control (i.e., it will verify that the user is a previously authorized/registered user), if the password entered by the user coincides with the one the router has in the table of user and password control and it will verify if the user is linked to this device (according to the table of device control). If the user is not in the table (he is not authorized/registered), the password is incorrect or if access is been performed through a device to which he is not linked according to the corresponding table (as will be described below), access will be denied to the user. Furthermore, the router will send a message to the table of denied users for storing the identification of the user who has been denied access.

All the previously described communications between the device and the router are performed by means of layer 2 messages (also referred to as data link layer or level) of the OSI (Open Systems Interconnection) model.

There will also be a table of device control (310); in this table, devices having authorized network access (by means of their MAC address or IMEI, IMSI, MSISDN . . . which identifies said device) are registered and users who can access the network with each of the authorized devices are added. It can be said that this table is an extension of the table of authorized devices (the table of authorized MAC addresses described above) including the users who use each device for accessing the network. Seen otherwise, for each registered user the devices with which he can access the network appear in this table. If the device is not in this table, it will not be able to be linked to any user so that it will not have access to the network.

Innovation in terms of linking the users with the devices must also be pointed out. All the users registered in the network must be linked to at least one of the authorized devices, since otherwise they will not be able to access the network. The methodology used is that the users are linked to the identifier of the device (MAC address, IMEI, IMSI, MSISDN or any existing identification in said device which unambiguously identifies same), i.e., this link is applied in the layer 2 of the OSI system. When using the link between the device and the user on the layer 2 of the OSI system, use of an external application in the devices is not required. With this innovation the risks of vulnerabilities in the system and identity theft both of the identifiers of the devices and of the users are minimized.

Figure 3:
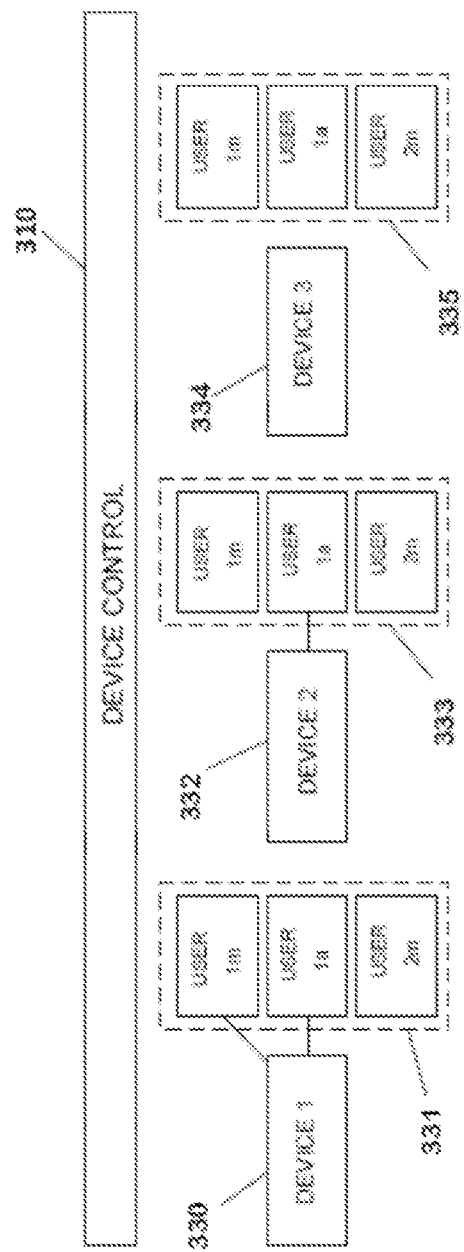
FIG. 3 schematically shows a possible example of table of device and user control according to one embodiment of the present invention.

FIG. 3 shows an example of the table of device control (310) of the internal database. In this case, the users linked to device 1 (which will be identified by its unique identification, such as MAC, IMEI . . . in the table) are user 1*m* and user 1*a* (331), these users can continue with the process, in contrast, user 2*m* will not be able to access the network using the device 1 because he is not linked to the device (i.e., if the router verifies that the device that user 2*m* is using is device 1 he will not be given access to the network). In device 2 (332) the only linked user is the user 1*a*, (333), i.e., user 1*m*, 2*m* and any other user will not be able to access the network from device 2. Device 3 (334) is not linked to any user (335), so it will not be possible to access the network from this device (even though it is in the list of devices authorized to access the network). This double verification (device and user/password) greatly increases the network access security.

Within the database, there can also be a table of profiles, where the profiles are assigned or defined for different users of the network. In other words, the profiles assigned to each user (to the authorized users which are in the tables of device control) will appear in this table.

In one embodiment, underage users (detected based on the user data, such as date of birth, the table for user/password control) are automatically assigned the parental control profile. This parental control profile can be linked to an age-associated Internet content (web pages, social networks . . . ) rating system, with a semantic analyzer service. One of the novelties of the present invention is using this system for granting Internet access. Using the age-associated external network (Internet) content rating system allows access to the Internet to have an age-associated rating system at the user level. Several categories can be included in the rating system according to the user's age (for example, over 7, over 12 or over 16 years old, although more categories can be added and configured). A plurality of descriptions of different content (obscene language, discriminating language, drugs, sex, gambling, horror, violence, social networks . . . ) can also be defined. All these fields are completely configurable by the system administrator. Therefore when the semantic analyzer finds that language of some of these types is used in the web page the user wishes to connect, it prevents accessing the network (depending on the age category to which the user belongs). For this content rating, in order to meet the different cultural standards in the network of different European countries, a scale similar to the one used in the PEGI system, started and managed by the European Federation of Interactive Software for software and videogames (not for web page and social network content) can be used for rating Internet contents.

The user can be assigned in this table to any of the profiles that are predefined in the database. For example, a standard profile that would be the by-default profile (and these users would have no authority to change the configuration) or an administrator profile for the system administrators (users having more privileges than users who are members of the standard profile, having the authority to configure and change the configuration of the authentication system). If a user is underage, he can be assigned a parental control profile. In this profile he is granted access depending on the user's age (for example, over 7, over 12 or over 16 years old). These linking to the parental control profile and to the category according to user's age are automatically performed by the router, since it knows the user's age from the entry for said user in the table of user control. The router can detect when the user becomes of legal age (e.g. above 18 or 21 years old) and he will be automatically eliminated from the parental control profile and added to the standard profile, for example. In these cases, control measures such as, for example, informing the network administrator (by means of SMS, e-mail or the like) of these situations, so that he is aware of them, can exist.

As described, a semantic analyzer, which is responsible for analyzing the web pages that users with parental control profile wish to visit, will also exist in the router for analyzing the web content and blocking access to the web depending on the content thereof. To that end, before showing the content of the web page, the semantic analyzer analyzes the page content and stores said information in the memory. If it is a web page that has already been visited, information concerning its content is already stored in the router and, if said stored information is not very old (its age is less than a given time limit), the router can use it for denying access or not. If it is very old, it can analyze once again the web page content in case it has changed. The semantic analyzer has direct communication with the external database (which will in turn access said web pages) for performing said online verifications of the web page contents that the user wishes to visit in order to restrict access or not. The semantic analyzer does not deny complete access, what it does is to prevent access to the web pages with illicit content.

In addition to the profile associated with each user, an entry or table of time of access (also referred to as table of time policies) can also exist in the internal database. The network access time limits (i.e., the days and times when it can access the network) will be defined in this table for each user and/or device. These access limits are predefined by the system and can be manually configured.

All the users (directly or through their profile) and devices (except for the administrators) must be defined in this table since, if they are not defined, they will not be able to access the network. This time access at the router level is an innovation since currently the routers on the market do not make this distinction.

In order to be able to apply said time limits, the router must know the day and the time and other data, such as, for example, the non-business days that must be applied (since the time access can be linked to the fact that it is a non-business day or a business day). To that end, the router will have to use an NTP service (the logic of this service will be in the level 3 of the external database), for example. In order to know the non-business days to be applied, the NTP service must know the zip code and applies a working days calendar depending on said code. This configuration can be performed at the time of the first configuration of the router, when the zip code is requested from the device in order to correctly register the date, for example. This date can only be configured in the router and no user other than the administrator can access same; the date and time can be periodically refreshed by accessing the NTP service.

The fact that this table of time of access is connected to the NTP service housed in the router itself (at the external database level) is an innovation since this is currently not implemented in any router and it allows a more intuitive and simple management when managing the network. This adds intelligence to the router, since based on a series of data it can decide and know the current date of the week and it can decide the time limit for one or more specific users and, based on those limits, decide whether to allow network access or not.

In a possible embodiment, there would be an entry for each device and for each user linked to each device in this table, indicating, for each day, the time range(s) in which the network can be accessed (defining a start time and an end time for each range, for example). Continuing with the example shown in FIG. 3, device 1 would have an entry in this table and, in turn, there will be another entry in the table for each user linked to this device (1a and 1m). The registered devices may be also assigned a time limit independent from the user. Thus, for example, device 1 may have no time limitation (so the range of access listed for this device would be for every day from 0:00 to 24:00), whereas the users do have a time limitation, for example, user 1a can access the network from 08:00 to 22:00 on business days, whereas on the weekends he can access the network from 12:00 in the morning to 00:00 and user 1m from 19:00 to 21:00 on business days and until 22:00 on the weekends (user 1m has a more restrictive access policy because the system knows that he is underage).

In one embodiment, if the device or user is not in this table, it supposedly does not have time of access restriction. In an alternative embodiment, if the device or user is not in this table, it supposedly is not authorized to access the network and will be denied access. In one embodiment, if during the communication established by the user, the allowed time of access is exceeded (i.e., when the communication started he was within the allowed time of access, but at a certain time said time is exceeded), the router can cut off communication and deny access. To that end, the router can periodically verify the table of times of access for the communications in progress.

Another table (or entry or register) that could exist in the internal database would be the tables of security policy. This table will define a series of rules establishing the security policies, such as for example, with which addressees and/or which services and/or which ports and/or which web pages and/or with which protocols (for example FTP), each user or each device can access. In the existing solutions, the access security policies are applied in the layer 3 of the OSI system and the network elements applying said security are the firewalls. In the present invention, the security policies are applied in the layer 2 of the OSI system (in the router or switch), i.e., said policies are applied before obtaining an IP address. In addition to applying these policies in the layer 2 of the OSI system, the policies are also applied at the user level, i.e., independent form the device and the IP address, the system applies said security policies to the users registered in the system. These policies would be applied both at the origin and at the destination, i.e., both at the entrance of the network (inbound) and at the exit (outbound), so they affect both the communications network managed by the router (to which the router belongs, referred to as internal network) and external networks/Internet. Another innovation of this system is that policies are also applied to logic ports (TCP/UDP), there is currently no equipment which applies these policies to users and devices without needing IP addressing.

FIG. 4 shows an example of the table of security policies (416) of the internal database. As can be seen, rule 1 (460) states that if user 1a (461) linked to device 1 wishes to access device 2 (462) at the SMB and TCP 25 logic ports (463). This communication is allowed by the router (464), but it is only allowed at these logic ports, meaning that if device 1 (461) wishes to access device 2 (462) through other ports different from the previous ones, these communications cannot be established since there is no rule in the system allowing it. In rule number 2 a Google access policy is defined which is allowed for user 1m (161), this means that the underage user 1m can access Google, but if this user wishes to access a web page with illicit content, he will not be able to access same through Google (the semantic analyzer would block the access since the user has an underage profile). In other words, concerning the policies of underage users, denying or allowing access to a web address can be predetermined by means of these rules of security policies, but even when access is allowed by the security policies, if inside said web the user wishes to access data which is configured in the age-associated content rating system (in the semantic analyzer) as non-allowed data (for example, related to sex or violence), the semantic analyzer of the router will detect it, the router will block this user's access to that page, the web will automatically be labeled as "forbidden" and it will be included in the semantic analyzer as a forbidden web page.

The rule number 5 indicates that those communications that are not explicitly comprised in the security policy database would be automatically rejected, so that it automatically drops the traffic and denies access. As can be seen, there are two types of reject actions in the table "drop" and "reject", the difference is that DROP receives the packet and discards it (without responding to the emitter) and REJECT receives the packet and processes it and builds a reject packet and sends it back to the emitter. In another example in which the required security is lower, those communications not explicitly comprised in the security policy database can be said to be allowed by default.

Finally, there could be a table (117) (referred to as table of activity register or "log", for example) in the internal database, where all the activity of all the users and devices of the system (communications that have been established, addressees, date and time . . . ) is stored. In one embodiment, all the access attempts are recorded whether they have been successfully authenticated or not.

SDHCP:

Besides the authentication system or mechanism, another mechanism applied in the system proposed by the present invention is the secure dynamic host configuration protocol (SDHCP or secure DHPC). The object of the SDHCP is to secure the DHCP, such that the configuration, assignment and distribution of (IP) addresses and network configuration parameters (layer 3) in a communications network is performed in a more optimal and secure manner.

To that end, policies based on roles (profiles) directly linked to the physical identification of the device (for example, the MAC address) are used. Thus, the SDHCP service will be able to make decisions of restriction or access, not only based on the assignment of IP identifier to the device that has access, but also based on the protection of level 2 (data link level of the OSI model) offered when denying any negotiation between the client and DHCP server without the client having been previously added and managed in the roles.

This is possible due to the presence of a database in the network element (for example, the router) accessed by means of a SDHCP functional element, known as a secure agent and acts with the network configuration parameter server (SDHCP server). This database relates level 2 network identifiers (for example, MAC address) of the network elements with level 3 identifiers (IP) and in turn with the user roles (profiles). This way the protection of the service is not reduced just to filtering MAC or to policies of assigning and reserving IP addressing, since it provides a strict control and link of each DHCP client connected in the same network area. Therefore, use of this new database for the new SDHCP service improves in terms of security the structure used until now in the DHCP protocol that uses two independent databases described in the Background of the Invention section (the structure of the BOOTP protocol and the structure storing the stack or set of available addresses).

The secure agent (also referred to as security agent) is a functional module or element that usually is physically present in the same network element (e.g. router or switch) as the SDHCP server. In an alternative embodiment, it can be present in another network node (with which the SDHCP server communicates through a communications network).

It must be pointed out that, it is introduced as a security measure in the SDHCP, the implicit denial of all those level 2 broadcasting requests derived from the process of requesting and offering between client and server (by means of the register of the devices whose access has been denied in the denied MAC address register as previously described). During the process of assigning, the sending/receiving of datagrams directed to broadcast MAC address is performed in all the messages (DHCPDISCOVER, DHCPOFFER, DHCPREQUEST and DHCPACK) such that controlling and discarding those non-authorized requests (the devices of which are not authorized) entails an improvement, not only in terms of security, but also in terms of resource consumption of the device in which the SDHCP service is active. Furthermore, this method palliates vulnerabilities in the control of the information flow which was performed until now in the network layer or level 3 by means of firewalls.

Thus, for example, in the existing systems, a user of a device can manually configure the network parameters (IP address, subnetwork mask, gateway, DNS . . . ) and with these parameters configured in the device of the user, he will have access to the network. Using the mechanism proposed by the present invention, if a user wishes to manually configure the network parameters and wants these parameters to allow access to the network for the device, the device must be registered in the SDHCP secure agent database, since otherwise he will be denied access and the device will not be able to access the network. As previously described, with this implicit denial network security is increased, preventing access attacks such as those known as "saturation" attacks.

Figure 5:
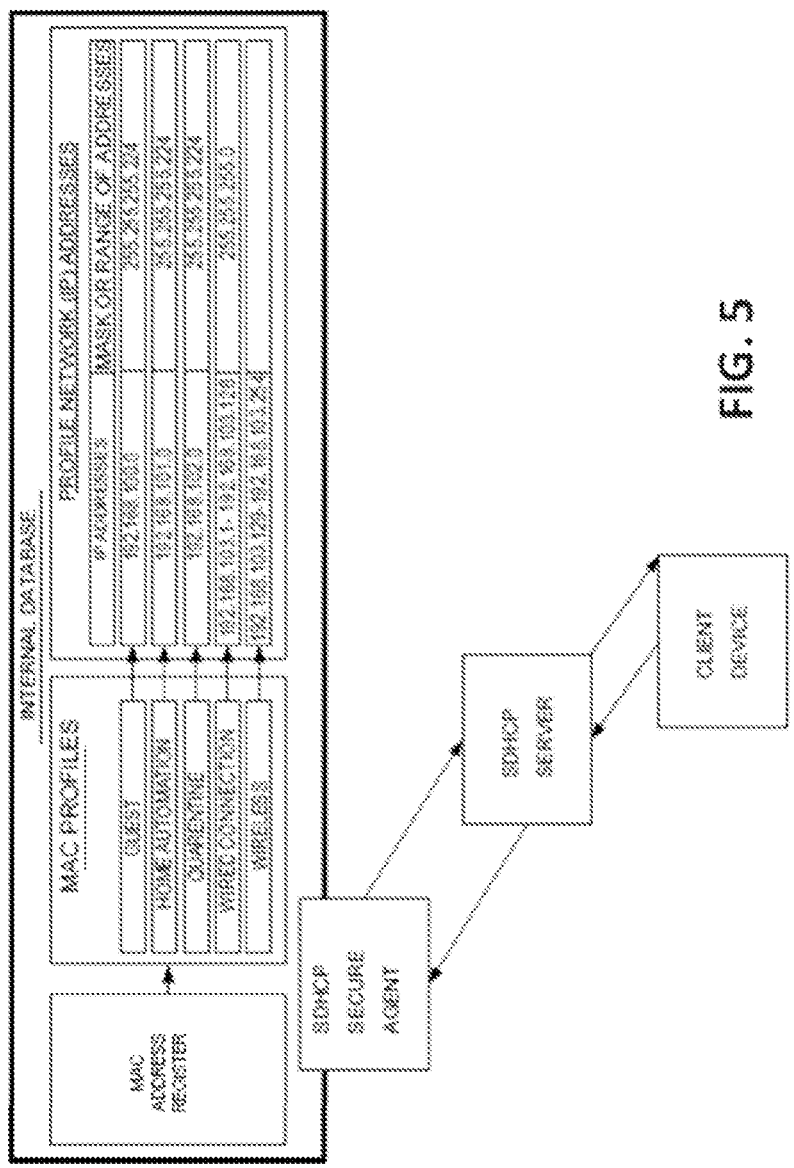
FIG. 5 shows a block diagram of the architecture of the SDHCP mechanism proposed according to one embodiment of the present invention.

FIG. 5 schematically shows the architecture of the SDHCP protocol proposed according to one embodiment of the invention. Said figure shows the client device or equipment that wishes to operate in the communications network, the SDHCP server in charge of providing it with the configuration parameters required for operating in said network (including the network address, for example, an IP address), the secure agent and the database with data for assigning the configuration parameters to the equipment. As previously mentioned, the SDHCP server can be in the same network element as the database and the secure agent (in the network element proposed by the present invention) or in a different network element.

The SDHCP protocol is based on the following elements (or tables of data):

MAC address register (also referred to as authorized or allowed MAC address register or authorized or allowed devices register): This table has already been previously defined in detail (in section concerning level 1), so it will not be described once again here. This table stores the MAC addresses (or other identifier) of the devices belonging to the network in question or, in other words, devices having authorized access thereto.

The SDHCP service can assign IP addresses in a static or dynamic manner. Whether this assignment is static or dynamic, the MAC address of each device allowed to access the network must be registered in this table, such that if a device requesting an IP address from the SDHCP is not registered in the database, the SDHCP will not proceed to assign any IP address thereto.

MAC roles (profiles): It stores the profiles (roles) in the network of the devices. A limited number of profiles can be configured, depending on the processing ability of the equipment. In this table, one profile or another will correspond to each device of the network (for example, depending on its MAC address); in other words, from the MAC address of the device (i.e., depending on the identification of the device, not on the identification of the user), the profile corresponding to the device is obtained through this table. In the case shown in FIG. 5, these profiles will be, for example, GUEST, HOME AUTOMATION, QUARANTINE, WIRED CONNECTION, WIRELESS; but obviously this is only an example and there can be many other different profiles.

Other than the MAC address of the device, the registered MAC and MAC roles databases can contain other identifications of the device such as the IMEI, IMSI, MSISDN or any other parameter identifying the device (i.e., it may store not only the profile corresponding to the device depending on its MAC address but also depending on one or more of these other identifiers).

Roles (profiles) of IP addresses: It stores the IP subnetworks existing in the whole network, and a range of IP addresses (defined by an IP address and an address mask, for example) is automatically assigned according to the subnetwork to which each device belongs. The device will belong to one subnetwork or another (i.e., it will be assigned one range of IP addresses or another) depending on the role (profile) that it was assigned in the previous table; in other words, in the previous table the network profile corresponding to the device according to its MAC address is obtained and in this table the range of addresses corresponding to said profile, and therefore to said device, is obtained. A given number of subnetworks can be configured depending on the ability of the equipment. These ranges of network are configurable, the system administrator only needs to say how many devices will be linked to each subnetwork and the SDHCP secure agent will automatically configure the range of network. Depending on the subnetwork (range of network) where the device is assigned (which, in turn, will depend on its profile), there will be a series of implicit rules that will allow or deny access to other devices, as a security measure. For example for devices with the assigned profile of GUESTS, since they do not belong to the network, it is convenient to deny access to the devices of all other profiles. These denials of access or configurations in general, are achieved with the policies applied by the router(s) of the network. In other words, the router of the network will be configured such that if the address of the device belongs to a given range of addresses (corresponding to a given profile) it cannot access other ranges of addresses (corresponding to other profiles). These restriction policies (or more generally, security policies) can also be applied at the port level. Thus, the router can configure that if the address of the device belongs to a given range of addresses (corresponding to a given profile), said device will be able to access through a given port and not through another (which will entail whether or not it can access certain devices or services). Thus, for example, in the case shown on FIG. 5, the range of IP addresses 192.168.102.0/x will correspond to a device having a profile QUARANTINE. It is decided (by the network administrator) that the devices having this profile will only have access to the Internet and for a limited time, but will not have access to other network resources and will not be able to communicate with other devices of the network. The router (or the routers if there are more than one) of the network is configured to that end, such that a denial of access to the whole network and all the devices of the network is applied to a device whose address is in the range of network corresponding to the profile QUARANTINE. Furthermore, for successfully limiting access to the Internet for this profile, the router can add a time policy. Continuing with FIG. 5, the range of IP addresses 192.168.100 0/x will correspond to a device having a profile GUEST. It is decided (by the network administrator) that devices having this profile (i.e., having an address in this range of network addresses) have access to the Internet but only with the use of the HTTP and HTTPS protocol, but that they do not have access to the remaining profiles or networks. Denial of access to the logic ports can also be applied here, i.e., the device belonging to this profile will be able to access the Internet through port 80 (http) but will not be able to access a server through SSH (port 22). In another example, the range of IP addresses 192.168.101.0/x will correspond to a device having a profile HOME AUTOMATION. It is decided that the devices having this profile (i.e., having an address in this range of network addresses) have access to the Internet with the HTTP, HTTPS, SSH, POP3 protocols and from Internet towards them.

In other words, according to the IP addresses assigned thereto (according to the profile) it will have restricted network access or not. If it has restricted access, generally speaking, it can comprise at least one of the following restrictions (or any other type of restriction):

denying sending data to the device;
denying communicating with the rest of the devices of the network;
denying accessing at least one port;
denying communicating by means of at least one protocol;
authorizing accessing only the Internet;
accessing the network within a given period of time.

The network administrator can configure these tables (databases) and change their content whenever this is required. The SDHCP secure agent can also dynamically make a series of decisions for adding profiles, modifying profiles, changing the device of the profile to which it is linked, changing the configuration parameters of each profile . . . according to the circumstances of the communication or different conditions detected in the device or in the network. For example, when the antivirus database of the device is not updated or the device has a virus or Trojan, the SDHCP agent can make the decision of temporarily deleting it from the profile to which it belongs and assigning another profile thereto (quarantine) so that the device will not infect the remaining devices within the profile (and the network) to which it was assigned. In other words, if the SDHCP agent detects that the security conditions of the device are compromised it can assign a more restricted network access profile thereto, and vice-versa, i.e., if the SDHCP agent detects that the security conditions of the device are no longer compromised (for example, its antivirus database is updated) it can assign a less restricted network access profile thereto.

Figure 6:
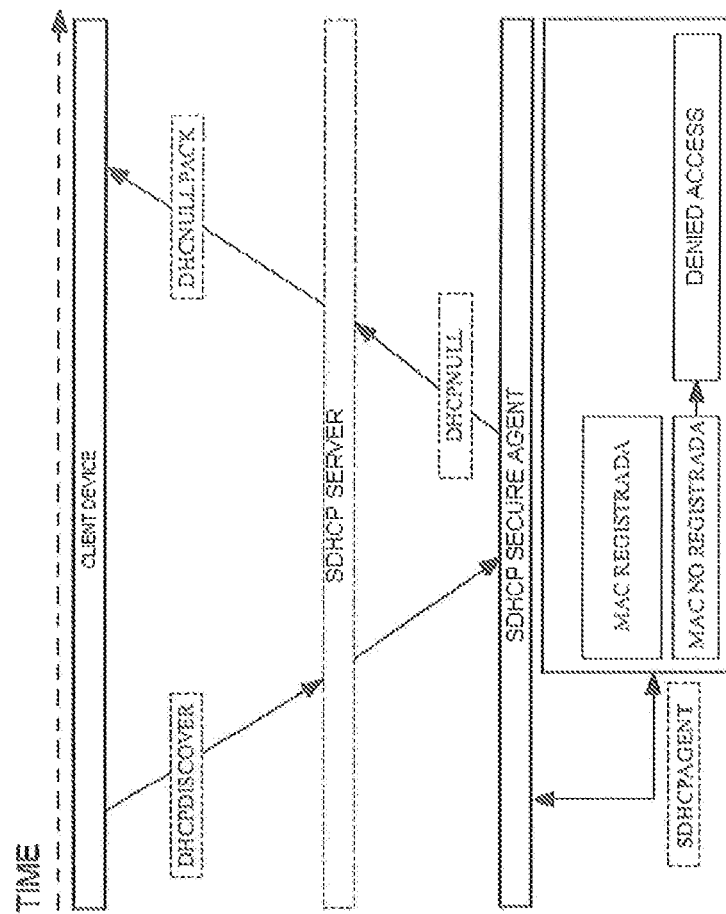
FIG. 6 shows a diagram of messages exchanged between a client device or equipment and a SDHCP server, in the case that said device is not registered in the internal database, according to one embodiment of the present invention.

FIG. 6 shows the flow of messages exchanged, according to one embodiment of the present invention, between a client device or equipment and a DHCP server using the proposed SDHCP protocol in the event that said device is not registered as an authorized device. Each of the steps in this scenario is hereinafter described and listed, according to one embodiment of the present invention:

1. The client device (requesting the network configuration parameters because it wishes to access the network) sends a message requesting the network configuration parameters, which is received by the SDHCP server (which is in the router, for example).
2. Once the SDHCP server has the request, the server sends it to the SDHCP secure agent and the latter sends a message requesting information about the device from the database. This message is referred to as SDHCPAGENT.
3. Once the verifications in the database are performed, and since the MAC address of the device is not registered in the corresponding table, the SDHCP secure agent sends a message referred to as DHCPNULL to the SDHCP server which contains the information needed for denying access.
4. The router (SDHCP server) sends the message DHCPNULLPACK, notifying the client that an IP address cannot be assigned. This message can include a notification asking to contact the network administrator in order to be properly registered.

Furthermore, the SDHCP server or the router itself where the secure agent is located will send a message to the table of denied MAC addresses in order to store the MAC address of this device that has been denied access.

Figure 7:
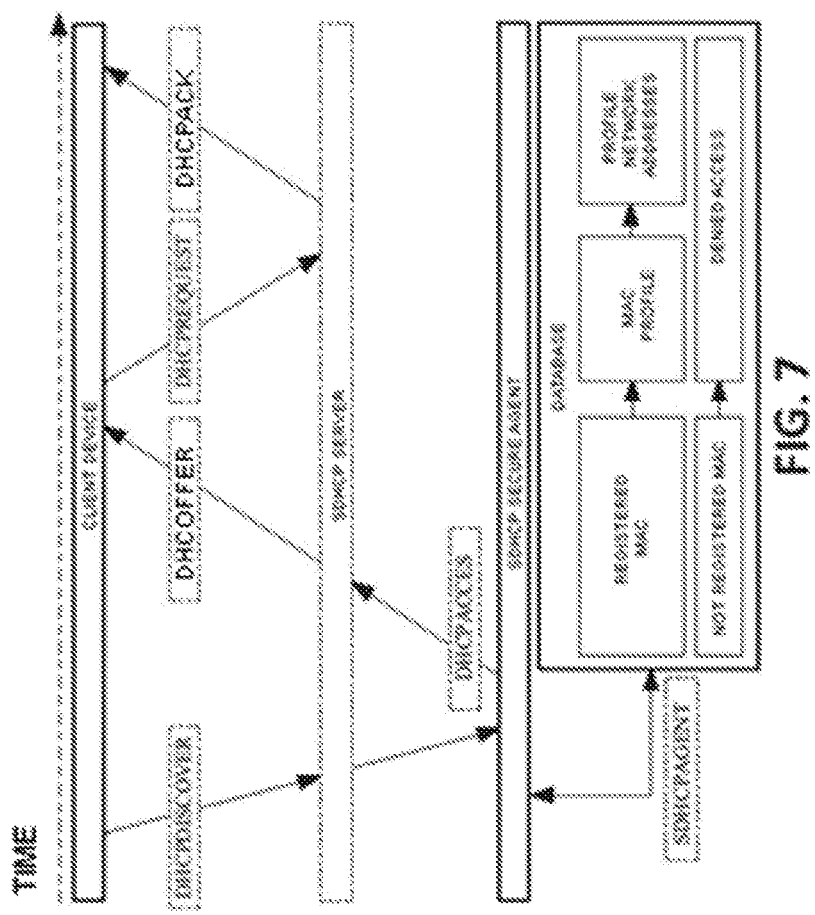
FIG. 7 shows a diagram of messages exchanged between a client device or equipment and a SDHCP server for obtaining the network parameters, in the case that said device is registered in the internal database, according to one embodiment of the present invention.

FIG. 7 shows the flow of messages exchanged, according to one embodiment of the present invention, between a client device or equipment and a DHCP server for the distribution of the network parameters (including the IP address) using the SDHCP protocol. Both the messages mentioned in this scenario and in the previous scenario are layer 2 messages (also referred to as link layer) of the OSI model. Each of the steps to be performed for assigning IP addresses and other network configuration parameters are hereinafter described and listed, according to one embodiment of the present invention:

1. The client device sends a message requesting the network configuration parameters (for example, the IP address) which is received by the SDHCP server. As in the previous case, this message will be a DHCPDISCOVER message, for example, and in order to send it, the device will use a broadcast address since the client does not have the address of the IP server and, therefore, cannot directly connect thereto. This message includes information that allows identifying the client device (its MAC address or another type of identifier, for example).

2. Once the SDHCP server has the request, the server sends it to the SDHCP secure agent and the latter sends a message requesting from the database (e.g. from the router) information about the device that is requesting the assignment of network configuration parameters and, in particular, the IP address (or in other words, the SDHCP server verifies in the database if the identifier of the device is registered by consulting the database).

3. If the identifier (the MAC address) of the device is registered within the database (as is the case in this scenario), a user profile in the table of MAC roles is assigned thereto according to the identification of said device. As previously indicated, other than the MAC address of the device, the database can also have other identifications of the device registered. In certain scenarios, instead of the MAC address, the device can send one of these other identifiers; in those cases the table will be verified in the same way but starting from this identifier instead of the MAC address of the device.

From the assigned profile, in the table of roles of network addresses, the network configuration to which the device belongs is assigned. The secure agent obtains this configuration and sends it in a message to the SDHCP server. This message is referred to as DHC-PACCES.

4. The SDHCP server sends a message (DHCPOFFER) to the client device with the whole network configuration that has been assigned to said device according to the internal database. This message can include several available IP addresses (or a pool of IP addresses) and the client device is the one that chooses a specific IP address from those offered.

5. The client device receives the DHCPOFFER and sends another message referred to as DHCPREQUEST by broadcasting, indicating the network configuration it chose (including the IP address it chose) if it received several possible ones.

6. The SDHCP server receives the DHCPREQUEST message and creates a message with the whole network configuration that the client device needs and the profile that has been assigned to the client device. The server compiles all this information in a message referred to as DHCPACK and sends it to the client device. At this time, the SDHCP server already has the information of the device registered. Therefore, its DHCPACK message can be a message specifically directed towards the device requesting the IP address, since the SDHCP server already has all the information thereof.

Both in this scenario and in the previous one, if there was more than one SDHCP server, the behavior would be similar. In that case, there would be on SDHCP server and one or more secondary servers, depending on how large the network is. Each of those servers would have their SDHCP secure agent and their database; the secondary SDHCP servers are synchronized with each other and with the main server, whereby the databases of the SDHCP secure agents would be properly synchronized and would have the same information.

Antivirus:

In one embodiment of the present invention, the integration of the antivirus systems of the clients (devices) connected to the network element (e.g. router) with the proposed global access system is contemplated. Parameters of the antivirus state, such as threat detection, are thereby included.

On the other hand, for the specific case of the verification of the state of the antivirus databases, a similar link will be established with the database provider, i.e., with the manufacturer of the antivirus system SW installed in the client, with which said element will be compared to have a higher degree of trust in the network environment applied by the router. It must be borne in mind that antivirus databases are where the current potential threats on the Internet are registered, and that antivirus protection therefore will not be real if it is not updated to the latest available version and distributed by the developer of the antivirus SW.

Therefore, the access system proposed in the present invention can include a new improvement in relation to the trust environment of the router towards its clients. The router establishes a link by means of the verification of the antivirus state and type. The verification log will be in the internal database and therefore intervenes in level 2 of the hierarchical security of the authentication system. The primordial factor for verifications of this type is the actual state of the protection of the operating system by the resident antivirus system in each device. The types of states will be:

As regards the antivirus database, it can be updated (the antivirus protection has the most recent information about all types of threats to perform a real-time analysis or not of the operating system in the client device) or not updated (otherwise).

As regards the state of the operating system of the device, the states can be:

Not infected:
Immune: The system is completely protected and will have the policies in the router that allow it the connections both in the local network environment and in the external or public network environment (Internet).
Preventive: It has been some time since the antivirus system has performed an analysis of the operating system installed in the client device (so it cannot be assured that the device is completely protected).

Infected:
Critical: Infection related to a malicious virus or software that requires communications for its operation, spreading or sending of information to a third party.
Low: Infection related to a malicious virus or software not requiring communications for its operation and spreading.

Based on each state or circumstance that the antivirus system is in, the access authentication system hosted in the router will make an access decision as regards the connections it manages for each user/device registered in the system:

Allowed: There are security assurances for communications. Approval of all communications required by the client device (of course, this approval will be conditioned by the fact that the client device and the user pass the remaining security controls of the router that have been described in the preceding sections).

Denied: There are no security assurances for communications. All communications related to that device are prohibited.

Temporary: There are still no integral assurances for communications. Approval of temporary permits for performing on-line analysis or update tasks of the resident antivirus system.

Thus, for example, in the event that the system is in the updated antivirus database, not infected-immune or infected-low state, access can be allowed; if it is in infected-critical state access can be denied; and in all other cases access can be temporary. The internal database can request information about the antivirus state of each device from the external database, as explained hereinbelow.

In the event that there is a denial of access (temporary or permanent), a message (for example, AV1CHANGE) can be sent to the SDHCP server to modify the profile of the device and assign the quarantine profile to it. In the quarantine profile, it may only have external network access and for a given time so that it can update the antivirus software or eliminate the virus infection. While the device is in the quarantine profile, it will not have access to internal network services and resources. Usually, when the device is performing negotiations to access the network, requesting the configuration parameters of same (using SDHCP), the antivirus server runs a check and if it verifies that it is infected (or, for example, it does not have the antivirus database updated), it will send the message AV1CHANGE to the SDHCP server and the profile that it will assign to it (and, therefore, the network configuration parameters that it will assign to it) will be the quarantine profile. If, in contrast, the client has already completed the process and is connected to the network, if the client receives a virus or Trojan while connected (or the antivirus database becomes outdated) and the antivirus detects it, the antivirus service will send the message AV1CHANGE to the SDHCP and the latter will change the profile to quarantine. The SDHCP will send a message to the device notifying the network configuration parameter change and will send the new configuration parameters (among them a new IP address) that will correspond to the new profile (the quarantine profile).

It should be pointed out that verification of the antivirus system will always be based on the device (MAC) and not the user. This is because the antivirus system coexists with the operating system of the device and therefore the states are directly related for all users thereof.

In order to be informed of the state of the antivirus system in each device, the router can be able to distribute to the devices additional software that, once installed in the client device, will send information about the antivirus system state to the router (for example periodically or whenever an event relating to the antivirus system occurs). The router will then interpret and make a decision based on said state.

In order to distribute the information about the antivirus system of each client device, the SNMP (Simple Network Management Protocol) protocol can be used for the cases of antivirus centralization environments, i.e., client/server. In order to have communication between the router and the antivirus server, the protocol must be supported at both ends, such that information about the antivirus databases is sent as it is done with verification of the MIB (Management Information Base) of standard SNMPs. For that reason there must be an available SNMP agent that manages the sending of messages as well as the remote management of the device if needed.

For the specific cases in which the operating system of the client device connected to the router does not support the installation of an antivirus, additional verifications for gathering user information for the user register in the authentication system can be contemplated. Said type of information to be required from the user will be predetermined in exclusive roles for such case, in which the actual user role will require different information and which will be interpreted by the access system and accordingly detailed in the DB. The information to be stored by the devices which do not support any type of antivirus SW is:

Operating system version: For the verification of whether it is updated to the latest version containing vulnerabilities related to critical threats of the system.

Operating system state: Whether or not it is blocked, such as for example for the case of mobile devices that are blocked due to theft or loss. The legitimate client data are thereby also protected.

In these cases, the router can be responsible for distributing the patch or software developed for the verification of said information, as occurs with the users supporting the installation of antivirus systems.

For greater security, communications between the access system (router) and client devices will be encrypted so that the exchange of information is not captured or exposed to any type of malicious attack. The same will occur in communications between the router and the verification elements on the Internet (Server Developer and Centralized Server) for the antivirus system database verification and comparison process.

The ports and protocols used for security in communications will depend on the development of the manufacturer on one hand, or on the security implemented in the centralized system by the organization or company exploiting the characteristics of the access system.

Geolocation:

The proposed access system can also incorporate mechanisms whereby it will be able to locate the network element (and also the devices in one embodiment) and relate the location as a state verification and accordingly provide added protection to the network device in which this new access system is hosted (for example, a network switch or router).

The geolocation system will then provide the positioning (for example, the geographical coordinates of latitude, longitude and altitude) for processing data based on the network element or device information and the user information for users registered in the authentication system. It entails an improvement of the abilities of the new network element to generate connected client device registers, as well as a new protection methods as regards the services provided by the device to clients, whether it is access to the Internet, TV, Telephony, among others. In summary, with the use of the new network element and the software and hardware mechanisms it incorporates, a new traceability solution that provides greater reliability and protection not only to connected users but also to organizations intervening in global Internet security is introduced.

To locate the device or network element, any known geolocation method can be used, such as, for example, GPS, IP address geolocation, mobile network geolocation (origin cell ID), assisted GPS, E-OTD, TOA, multipath fingerprint, received signal strength . . . ) or any other type of geolocation system (i.e., any technology that allows geographically locating the device, giving its exact or relative location).

In one embodiment, geolocating will be performed by means of a GPS (Global Positioning System) module incorporated in the network element and integrated with the rest of the HW making it up. The GPS will perform state verifications of the coordinates every predetermined period of time during the manufacture and start up of the device. Usually, this value should not be able to be modified for security reasons since the fact that it could be deactivated would entail a breach of the security policies and of the level hierarchy on which the solution is supported.

There are cases in which GPS will not be able to provide positioning values. In such case, other methods are contemplated, such as, for example: manual positioning (manually entering the geolocation coordinates of the device, which will be certified by connecting with a server verifying said location), positioning provided by a third party (for example, the service provider supplies said information to the router by means of any method used by the provider, such as, for example, E-OTD, TOA, RSS, . . . ) or GeoPing (which allows positioning devices by means of the ICMP protocol latency).

In these aspects, client devices (also referred to as user devices) connected with the network element (router) for accessing the network could be mobile or static. If they are mobile, they will be assigned a user profile that contemplates the variation of the geolocation coordinates of the device, while static devices will be associated with user profiles which, due to their characteristics, do not in any case have to experience coordinates variations. That is an important factor when making a decision about the communications managed by the device since, for example, a smartphone (mobile) will not be treated the same way as a TV signal decoder or a SmartTV (static). Thus, for example, if the device is mobile (tablet, smartphone . . . ), it could have access to another type of networks and it can be managed by software in the cloud of the service center and could have different coordinates at any time, while static systems such as a SmartTV must always have the same coordinates. The information that the device is static and dynamic can be entered, for example, by the administrator in the router when it registers said device in the tables of the router during configuration.

The main functions of the geolocation system will be that of locating the router (which will be geolocated) and the traceability of the connections of the end user. The devices could also be located associated with the router, whether or not they are within range of network. In other words, when the devices are connected to the same network to which the router belongs (internal network), the devices can be assigned the coordinates of the router, but when they are not in the same network to which the router belongs (i.e., they are connected to the router through an external network) they will have the location coordinates corresponding to it (obtained for example through any geolocation mechanism the device has, such as GPS), but in no case will it be that of the router.

The location of the network devices and/or element entails a substantial improvement in security for cases in which theft, loss or malicious use occurs. The network element or device geolocation information will be stored (for example, in servers located in the centralized service centers of the client) so that they are available to the router when it has to perform verification tasks or authorized modifications to same. These service centers are platforms where the routers of the clients (users) are accessed in order to be able to manage devices and the router remotely from the Internet. A secure link will be established with said servers between which communications will be encrypted, thereby preventing information from being exposed in unwanted environments. Once the position of the device is established, checks will be made periodically so that in the event that there is any variation in the coordinates, the access authentication system will determine the action to be taken. If the current location of the router or device does not correspond with the latest position authorized by network administrators or by the installer (which will be saved in the previously described coordinate log database), the access system will usually decide to block the device. Furthermore, in the event that the current location corresponds with the latest position, no action will be performed.

As an additional point, and exceptionally, the new element may send a message (through the information incorporated in the "GPS coordinate register" of the internal DB of the authentication system) in the event that there is a variation in the geolocation state. For example, when a client has services contracted from of service platforms (such as DIGITAL PLUS), these services will be associated with the router and the coordinates of the router itself; if the router were to change its location to a location that is not allowed, the implicit denial mechanism will block access to said content (as previously described) and a message will be sent to the service platform warning it about of said access attempt from an unauthorized location. The same can be done at the device level, i.e., if the device has a geolocation mechanism (for example GPS), it will report its position periodically to the router (or every time it requires accessing the network). If the router detects that it has changed position and said position is not among those that the router has in its database as allowed, it can deny access (to the network in general or to a specific service).

On the other hand, traceability of the connections of the user relates to the mechanism whereby all communications of client devices (user devices) managed by the proposed network element (router) device will not only be registered but it will also be possible to send said information to a third party. The following are cases of traceability:

Packet/datagram trace: Whereby the client devices geolocation information will travel in the network in which they are located. In other words, the router can periodically register where the device is located (assigning it the actual position of the router or the exact position of the device obtained through a geolocation system of the device, for example, GPS); this location information can be included in the packet datagram or in the payload. Once the standard has been universalized, this function could be the greatest communications control, maintaining relative anonymity, as regards Internet users.

Trace information: The new device registers client device connections and stores them in a database as a measure for preventing fraudulent uses of the device.

It can be said that this process of geolocation has several steps:

When the router is started up for the first time, the position thereof is taken (by means of GPS or any other method). In one embodiment, the "GPS coordinate log" will have a series of predefined locations allowed for the router and it will also be verified if the location thereof is within these allowed locations (if it is not, then the router will be blocked).

The new router saves the geolocation information in the "GPS coordinate resiter", and it optionally sends the geolocation information to the centralized service centers in which said information will be stored.

Positioning verification: Periodically, the device (e.g. the router) obtains its current location and sends it to a database so that it is compared with the latest position of the device that has been saved (i.e., it compares the current position with the latest authorized position), and if it has changed, it is blocked. In one embodiment, the "GPS coordinate register" will have a series of predefined locations allowed for the router and it will also be verified if the location thereof is within these allowed locations.

In one embodiment, these three steps are also applied to the position of the devices accessing the network through the router (i.e., the position of the device is obtained, said information is saved or is sent to the centralized service centers and it is periodically verified if it has changed location and if the new location is allowed; otherwise access will be denied).

Level 3: External Database (External Access Database)

In order to be able to provide high-level protection to the network element proposed in the present invention (e.g. router), there is a series of mechanisms, the primary objective of which, is to support the mechanisms belonging to the internal database for obtaining additional information about external networks or indexing or correlating any type of data.

By calling it an external database, it means that this level has access to the outside and can be accessed from the outside, but it does not mean that the databases that are on this level are necessarily external to the network element (router), but rather they are databases that can be found in the router and can have access to external information.

In order to carry out these support mechanisms, a series of tables (or registers) are used which are stored in a database (or several databases) of the router, having access to external networks/Internet (hence it is called an external database).

These mechanisms can comprise an NTP service, a content rating service, a single user synchronization service, an antivirus service and a geolocation service.

NTP Service:

The NTP (Network Time Protocol) service or protocol is a protocol that is used for obtaining and assuring the exact time and date. An external server (NTP server), for example, can be consulted to that end. In one embodiment, the router can have a trustworthy measurement of the exact time and it would not be necessary to consult an external server. NTP is used for the time and the date of the clock in all the devices of a network and it uses universal coordinated time (UCT) in the port 123 to establish communication between the client device and the server. In the case of the present invention, the NTP service is oriented towards providing the router with the exact date and time, which allows the automation of different security mechanisms, particularly of the authentication system, as previously described (assigning parental control profiles, knowing if network access occurs within the authorized schedule . . . ), thereby maximizing network security and improving the management thereof.

Thus, for example, the NTP service allows:

Synchronizing the date and time of all devices and users.

Identifying ages of the users that are registered in the database to enable determining ages of the users at all times; with this methodology it is possible to known the age of a user and, based on this age, to apply one filter or another (PARENTAL CONTROL). The system does it automatically and does not require actuation of the administrator system.

Identifying the calendar applicable to the city of the users and thus being able to offer individual time limits for each profile and user, i.e., if the user of the network to which said user is connected is associated with, for example, the zip code of a specific city, the server will have the local business calendar and the non-business calendar, whereby time policies based on the local calendar will be applied.

In one embodiment, the router can have the NTP service configured in the address http://www.pool.ntp/tecteco.org. When the date and time is requested, this request reaches the NTP server and, based on the city where the router is located, a date profile is assigned to it. The NTP server in turn is in constant communication with the global NTP server http://www.pool.ntp.org/ in order to acquire the time configuration parameters.

Although the NTP service is the most common, the proposed access system proposed can of course use other services for obtaining the date and time data it needs for applying different security mechanisms.

Network Content Rating Service:

As indicated there is an age-associated external network (Internet) content rating system using a semantic analyzer, which downloads the web pages that parental control users wish to visit, to analyze the content of the web and block access to the web depending on the content thereof.

In this external database level, there is a module of the external network (Internet) content rating system or service that is responsible for feeding the semantic analyzer with the content of the web pages, it must analyze. This "downloading" of web pages for the semantic analyzer can be periodic. Once the content of the web pages has been analyzed, the semantic analyzer will update its own database, indicating whether or not access to said web pages is allowed for users with a given profile and category (for example, parental control for a minor under the age of 12).

Single User Synchronization Service (Also Referred to as Global User Synchronization Service):

This new service or system that can be incorporated in the present invention attempts to solve the problem that currently exists when pursuing and identifying a user in the network, for example, when the user commits a crime. To that end, this system is split into two fundamental components, one of them being really identifying all users (and devices, nicks, email accounts and service accounts of these users) that are on the Internet (in other words, identifying the physical person behind each user) and feeding this information to a worldwide database (an international database and/or a database synchronized with databases from other countries or governmental organizations . . . ) for management and control of said users.

The operation consists of all the users registered in the new authentication system, feed information identifying the physical person behind the user to the entry of the external database level of the router (and this information being sent to a worldwide database). To that end, user information is saved and registered in a table of the router (for example, in the table of user/password control) such as, for example: name and last names, ID number or some other identification, telephone number, date of birth, services in the network, such as, for example XBOX LIVE, PSN PLUS, Facebook, etc., emails, external connections, linkage of devices, etc. . . . . . This information is requested from the user, for example, when the user is registered in the network (which can be when the user attempts to access the router for the first time or prior to that). In one embodiment, if the user does not provide this information, he can be denied registration as a user (i.e., he is not registered as an authorized user), and therefore cannot access the network. This information about users is sent so that it is registered in a table housed in the external database level external to the router, for example, in a table SYN_USERID_WORLD which preferably has a format making it exportable and understandable by devices on a global level. This information which is housed in the external database can be sent and synchronized with a worldwide database. For correct operation and in order to not corrupt the data extracted from the database that contains said information, it may be necessary to install a second slave database within the infrastructure of the different Internet service operators (which will be communicated with other institutional/governmental organizations). The main server or servers of this worldwide database will therefore be housed in the different data centers of governmental buildings and will have access to data identifying physical people behind all users of all networks.

Antivirus Service:

The antivirus service for this level is a service for checking the antivirus version that is being run in the devices; it must also compare the list of viruses in real time. With this information, as previously described, the antivirus service described in level 2 could be offered, where the router could make access decision as regards the connections it manages for each device.

Therefore, the internal database will request the needed antivirus state information for each device from the level 3 antivirus service (for example, information about the antivirus version of a client device). Once the request is received by the antivirus service, this service consults its tables (of antivirus application database update and of viruses and Trojans) and the antivirus manufacturer and the service center. Once the information has been obtained, through the sources thereof it is made available to the internal database which does not cut off communication with the antivirus service until the latter responds. For the sake of security, the antivirus service residing in the external DB cannot access the elements making up the internal DB.

Geolocation Service:

Likewise, the geolocation service at this level will perform actions involving communication with an external network which are necessary for offering the geolocation service described in level 2.

Once the different elements existing in the network element (e.g., router) and the operation thereof have been described, an example of a mode of operation will be described below according to one embodiment of the invention to aid in clarifying the complete network access process and the interaction between the different elements. To that end, FIG. 8 schematically showing the interaction between the different elements in an example of operation of the proposed invention will be used.

Figure 8:
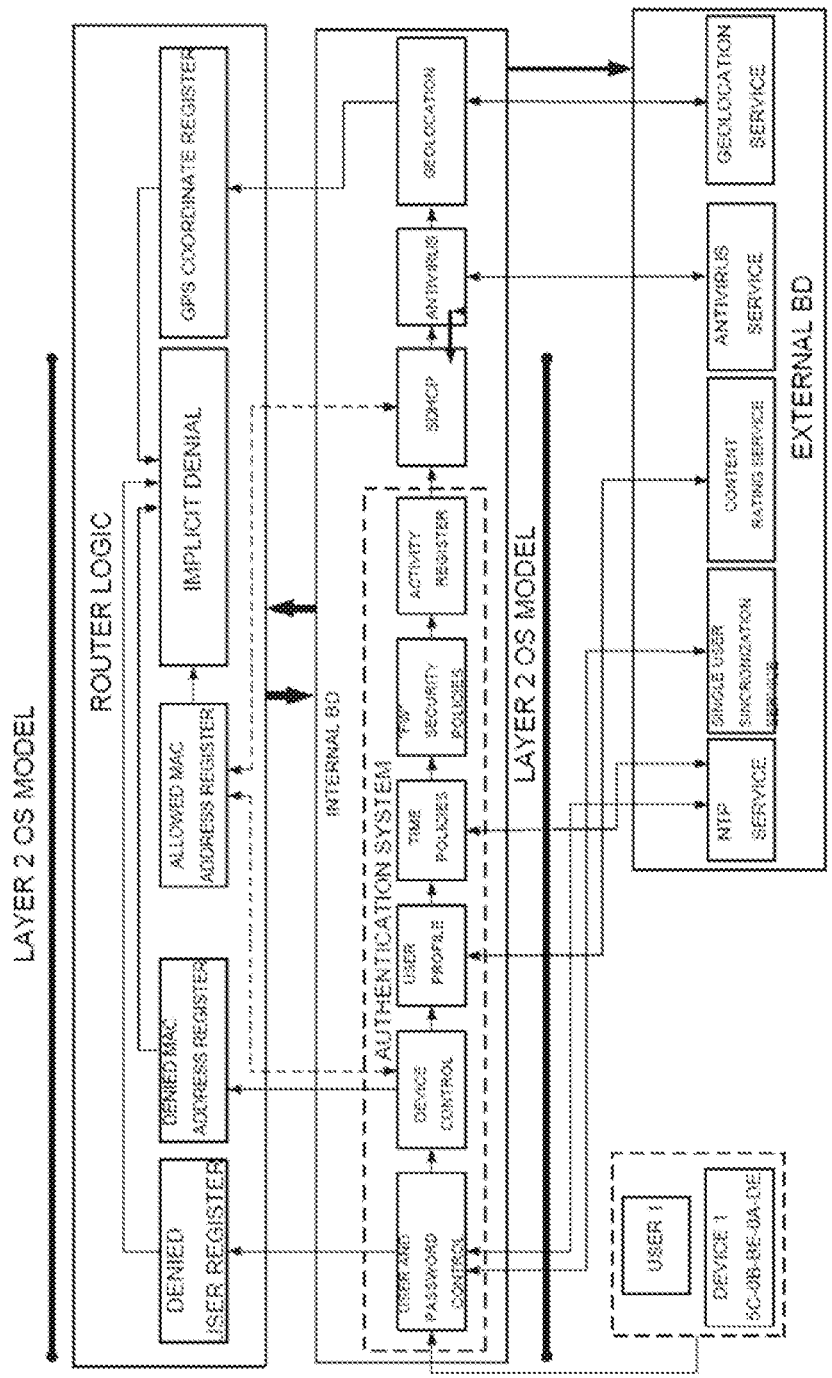
FIG. 8 schematically shows the interaction between the different elements of the solution proposed according to one embodiment of the present invention.

In the example described in FIG. 8, a user (user 1) wishes to access the communications network using an electronic device (device 1), to that end, when the device wishes to access the network, it sends an access request (in a layer 2 message of the OSI model) to the router and the latter, once the access request has been received, will request a series of data from the device. The device can be connected to a communications network external to the communications network to which the router belongs and in that case, the access request will come through that external network. If the device is connected to the communications network to which the router belongs, in that case, the access request will come through that network.

First, the router checks if the identifier of the device (MAC address, IMEI, IMSI, MSISDN or other identification) is registered in the "Denied MAC address register". If it is, the device will be denied network access. If it is not, it is verified if the identifier is in the authorized MAC address register. If it is not, the identifier will then be registered in the denied MAC address log and the device will be denied access. However, if it is registered in the "authorized MAC address register" the authentication process will start.

The registering in said table of authorized devices will allow physically opening the ports of the registered MAC addresses, as previously described. In other words, if an authorized device (its MAC address is in the table of authorized MAC addresses) is connected through a port which was previously closed (because an unauthorized device has attempted to access through it), this port will be automatically opened. When the authorized device concludes the network connection and leaves the port free, the port will remain open, but if the device which is not registered (that has previously accessed) wishes to again access at this time since the port 1 is free (not in use), the system will again close the port.

For authentication, the router requests the identification of the user who is accessing and his password in the first instance to continue with the negotiation (the router requests it from the device through the communications network itself or the external network if the device is connected to the communications network through an external network). The authentication system will perform the necessary verifications and compare the information received from the user and make the corresponding decisions. Therefore, if the user is registered in the "denied user register", or not registered in the database as an authorized user (in the table of "user/password control") or the password is incorrect, the process will not continue. In that case, said user will be registered in the "denied user restister" as a protective measure, because if the user wishes to access the network again, the implicit denial service will deny the user's access indefinitely. If the user is registered in the database, the process will continue.

Once the user is correctly registered, the authentication process verifies the following level, device control. In the table of device control, the router verifies the link of the user to the registered devices, i.e., it verifies that the device 1 being used, is registered in said table and linked to said user requesting the access. If the user is not linked to the device with which he requested access, the authentication process will not continue and said user will not be able to access the network and will be registered in the "denied user register". If the user is linked to the device, the authentication process will continue.

Likewise, as a protective measure, a user must be linked to any registered device of the network, if the user which is correctly created (i.e., the password entered coincides with the password saved in the router for that user) has not been linked to any device, said user will not have network access and will be recorded in the denied user register.

Once it has been verified that the user is linked to the device with which he accesses the network, the authentication process continues and the data in the entry (table) of user profiles will be verified. A network access profile will be assigned to the user in this entry. These profiles will be predefined in the router and can be, for example, the administrator, standard, parental control or any other type of predefined profile. If the user is considered underage, the router automatically adds said user to the parental control profile (age-associated rating profile).

Once a profile has been assigned to him, the user continues with the process, the next process is the time of network access. To that end, the table of time policies (or time of access) described above (see FIG. 3) is used. If the user is not defined or registered in this table, the process will not continue and the user will not have network access (and will be registered in the denied user register). If the user is defined in the table, the time of access configured in said table will be applied and the access process will continue. If the user is underage, time policies will be assigned to him according to the age of each underage user. These time policies can be predefined by the system, defined by the system administrator or predefined by the user's age. Once the time of access process has concluded, the users will have network access for the time stipulated in the corresponding entry of time of access (if they attempt to access outside the times stipulated in this table, the router will deny their access).

The following step is to manage access to the services using the security policies defined in the table of security policies described above (see, for example, FIG. 4). Accesses to the internal or external network which are allowed for each user, are herein defined. These rules are similar to those which would exist in a firewall of the network, i.e., a given communication can be established depending on the origin, destination, service and/or logic port. In one embodiment, the users, devices, groups of users and profiles must appear in these security rules in order to be able to access the network. Both outgoing and incoming communication traffic that is not defined in these rules or policies will be denied.

This concludes the authentication process. Once concluded, all the user and device activities can be registered and stored in a table of activity register (LOG).

After authentication, network access will be granted if all the authentication verifications are positive. If the user does not have a network address (and other layer 3 network configuration parameters needed for accessing the network) assigned to him, the user must request same from the network element to access the network and the process which is described below starts. If the user already has these layer 3 network configuration parameters assigned to him (because the user has these parameters from a prior access or because the user has entered these parameters in the device manually) it is not necessary for the device to request same from the router.

The SDHCP service will be used for requesting and obtaining the network configuration parameters. As described above, information about the device from which the user is accessing (MAC, IMEI, IMSI, MSISDN, or other identification of the device) will be received from the user, once the SDHCP receives the device identification, the SDHCP will decide:
  If the identification of the device is not registered in the database (in the corresponding table, in this case, in the "allowed MAC addresses register" bin), it will not continue with the process, the network parameters will not be assigned thereto and, as a result, it will not have network access. This device will be registered in the "denied MAC address register" bin as a protective measure, because if the device wishes to again access the network (more than a given number of times), the "implicit denial" service will block the port physically. At this point, verifying once again if the device is registered in the database is optional since it has already been verified at the beginning of the process, before authentication. However, in one embodiment this verification is also performed at this point as a security measure.
  If the identification (identity) of the device is registered in the database, the SDHCP server (the router) will assign the network parameters thereto based on the profiles or roles of each device.

As described above, these profiles or roles can be, for example, guests, home automation, quarantine, wired network or WIFI network. Depending on the identifier (e.g., on the MAC address of the device), one profile or another will be assigned thereto, which will mean that one range of IP addresses or another is assigned thereto.

Once this process of obtaining network configuration parameters has concluded, the device will have an IP address (layer 3 of the OSI model), so the device will already partially have network access. The next verification performed by the router is to check if the device is infected with a virus or Trojan and if the antivirus version installed therein is correct, to that end, the antivirus service can perform the following actions, according to one embodiment of the invention:
  If the device is infected or does not have the latest version of the antivirus software installed therein, the device's access can be denied or the antivirus service can send a message to the SDHCP server to modify the profile of the device and assign the quarantine profile to it.
  If the device is not infected and has the updated version of the software, it will have access to the network and to all internal network services and resources.

When the device has concluded the authentication process, configuration parameter request and antivirus state verification, if the device wishes to access the Internet or an external network, the geolocation service could tag the outgoing traffic with the router coordinates, these coordinates will be used to identify the user in the destination. The geolocation service will also have the option of denying the router or device service if the router or device changes location (to an unauthorized location). If the location of the router were to change, the geolocation service will register the change in the "GPS coordinates log", and the "implicit denial" will refuse access (for example to digital media platforms).

In one embodiment, the complete process described above (with complete authentication and network configuration parameter request) will only be performed the first time the device and user access the network and every time the device and user establish a new communication with the network. If the device and user are using a pre-established communication, they will already have network configuration parameters (IP address) and will already be authenticated, so it will not be necessary to perform the complete process again, but rather only part of it. In one embodiment, once the user is correctly authenticated and with his IP address, only the time and security policies are verified (and optionally the geolocation and antivirus is verified) every time he accesses the network to assure that he is accessing the network within the authorized time frame and that he accesses web pages, addressees or services authorized by the security policies (including the parental control policies).

In summary, it can be said that the proposed mechanism for accessing a communications network offers protection, management and automation abilities much greater than the systems existing today. It can be said that with this new generation of routers, the administration and management is much simpler than the one existing today since the network or system administrator (in the event of a possible problem or a modification of the configuration parameters) will not necessarily have to interact with the new generation router, but rather based on the mechanisms included in said router, the router itself will automatically search for and apply the best solution for said problems, optionally informing the administrator about the problem and the provided solution. Standards, protocols and network elements, such as routers, switches or firewalls, that have not seen any progress for more than a decade, have evolved with this new generation of routers.

The advantages offered by the proposed network element (with the global access system object of the present invention) are, among others:

Greater protection for external access to the network since intrusion is detected in the more exposed first segment of the network connected to the router (Internet or extensive networks with a large number of users). One of the most widely used computer attack techniques for gathering sensitive user information is identity theft or phishing. With the protection granted by the authentication system of the new solution, the users will not be exposed to such attacks due to the level hierarchy designed so that there is a correlation between elements of the two DB storing the solution. The hierarchy furthermore adds isolation and control of each of the fields or objects stored in the DB such that only specific flows exist internally in the system itself and they have been conceived so that they cannot be maliciously manipulated by a third party.

Increase in reliability with all LAN devices: Due to the verifications of the state of each of the devices by means of security controls applied in each level and antivirus check, which have never been integrated in any router or network access equipment.

Disappearance of "relative anonymity" in the network, linking users to actual information thereof (end client information such as name and last names, mail, telephone, GPS coordinates, third party services, ID number . . . ). All the user-related information could be transferred to the organizations regulating the network without this entailing a breach of privacy but rather an additional element for secured communications. Today there is public user data provided by the service providers but it does not reach the level of detail required by Internet services for the security of their clients. This directly affects the client/server reliability which is the pillar that upholds security in communications within a network.

Easy role or profile management: The router detects the different identifiers of the devices of the network and the operating systems hosting them (MAC, assignation, NetBIOS, etc . . . ), so user creation will not represent any challenge for the network administrator. The roles will incorporate predetermined rules in the policies of the firewall module related to the parental control system. With this pre-established action, automatic verification of the user profile and the sites and services offered on the Internet are linked without the administrator user having to have extensive knowledge concerning security and communications.

Protection automatism: As a result of the correlation and the logs of the network data, the implicit denial is enabled to make a series of decisions for improving network protection, automatically denying those communications that may be fraudulent: This adds intelligence to the router for processing and carrying out actions on the hardware elements of the device or the user profile. As occurs with the DB, implicit denial forms part of the security level hierarchical structure which, in this specific case, will never be within the user data contained in the DB. Therefore the shielding of this automatism is assured.

Content control: Application of security policies and content filters based on the user profile completely integrated in the authentication system, granting it intelligence since the authentication system is completely automatic and learns based on the threats detected in the course of user communications in addition to establishing policies at the user level based on said learning.

Single instance of identification: A SSO (Single Sign-On) can be said to occur between the different elements of the router. The user has only a single identification for the different functions of the router and its components, firewall W, content rating . . . . Usually, the ratio of the number of authentications with respect to the number of services is 1 to 1 whereas with this single authentication method, the user can validate by means of a single authentication many actions in the different modules of the device. Unlike the current solutions, it does not use a single element validating the authentication but rather several unique identifiers specifically linked to one another.

Interoperability with current protocols: The proposed router, its mechanisms and components, work correctly with current protocols and standards and can coexist with the external elements of the service provider and governmental organizations. It will be completely compatible with current communications protocols due to the fact that there is no manipulation of data packets and therefore of the headers thereof which contain information relating to the communications protocols. With respect to integration, the option the network operators will have so that the user who is validated in this new device and his credentials can be inherited by the service network access systems managed by the operator will serve as an example.

It works with any type of device with network access (e.g., the Internet), with any type of connection (current and future) and with any type of transport layer (ADSL, VDSL, FTTH, RDSI, frame relay, macrolan. . . . )

Improvements in the layers of the OSI model, improving the standards and protocol of each of the layers. The most significant improvements are in the layer or level 2 and 3 of the OSI model in which there are incorporated new security elements which will transform the protocols acting thereon, adding protection to the end user as well as to the network infrastructure itself. Protocols such as Spanning Tree or DHCP will require validation of the authentication system for an operation according to the security level required in the new solution.

New links between the layers of the OSI model, enabling a single communications control point in the access to a trusted or untrusted network. Communications control is assured by combining network identifiers of the protocols of the different OSI levels, respecting the hierarchy of the current reference model. In other words, by means of the proposed solution, identifier elements identifying level 2 of the OSI are associated with end user information relating to other levels of the OSI model such as IP, TCP/UDP ports, . . . as well as protocols of the last layer (application) such as the mail user. This does not mean that the information travels within the data packet but rather the relation of each identifier element is used for providing protection to the user. The fact of establishing a link between the MAC and the e-mail user to allow or deny communications going through the device with the new implemented solution will serve as an example.

Obtaining traceability in a more accurate manner and with less resources, time and costs by means of the new authentication and geolocation system. Unique data of each user using the network infrastructure as well as of the services housed therein is incorporated. The objective of the unique user data is to provide activity logs which can determine user location. This does not only entail a step for validating user access in the different network environments to which the device is connected, but also provides information for network resources administration and protection. This must be considered as an operation similar to the AAAA standard in which the network audit is reflected as a preventive action for the malicious use of the elements making up the network.

It must be indicated that not all the elements included in the router which have been described in this document are essential for the operation of the global network access solution proposed by the present invention; many of them are optional and they may or may not be included depending on the particular application and on the desired performances.

Although many of the presented embodiments refer to routers, the present invention is not limited to application thereof in routers but also in other network elements, such as for example, switches, firewalls, splitters and generally in any element considered as performing the network access management functions, either completely or partially. Take, for example, the case in which the gateway of the network is a firewall, so-called because it incorporates security abilities, to which it is possible to apply the detailed security mechanisms when performing the segmentation functions (switch) or demarcating the networks (router), . . . among other functions.

Note that in this text, relational terms such as first and second, greater and lower and the like, can only be used to distinguish one entity or one action from another, without actually necessarily requiring or implying that relation or order between said entities or actions. Furthermore, the term "comprises" and the derivations thereof (such as "comprising", etc.) must not be understood in an exclusive sense, i.e., these terms must not be interpreted as excluding the possibility that what is described and defined may include additional elements, steps, etc.

Some preferred embodiments of the invention are described in the dependent claims included below.

Having sufficiently described the nature of the invention as well as the manner of carrying it out in practice, the possibility that the different parts thereof could be manufactured from a variety of materials, in a variety of sizes and shapes must be highlighted, those variations recommended by the practice also being able to be introduced in its constitution or method provided that they do not alter the fundamental principle of the present invention. The description and drawings only illustrate the principles of the invention. Therefore, it must be noted that the persons skilled in the art could conceive several arrangements which, although have not been explicitly described or shown in this document, represent the principles of the invention and are included within its scope. Furthermore, all the examples described must be considered as non-limiting with respect to such specifically described examples and conditions. Furthermore, all that is described in this document relating to the principles, aspects and embodiments of the invention, as well as the specific examples thereof, cover the equivalences thereof.

The invention claimed is:

1. A method for the improved access of a user (101) to a communications network using an electronic device (102), where the method comprises the following steps performed in the Open Systems Interconnection (OSI) model layer 2 in a network element, where the network element is a router or switch which manages access to the communications network:
   a) receiving from the electronic device a OSI model layer 2 message including a network access request and an identifier of the electronic device;
   b) if said identifier of the electronic device is registered in an internal database of the network element as an identifier of a denied electronic device (108), denying network access to said electronic device and ending the method, otherwise, proceeding to step c);
   c) if the identifier of the electronic device is registered in the internal database as an identifier of an electronic device allowed to access the network (104), proceeding to step d), and otherwise, storing the identification of the electronic device in the internal database as a denied electronic device (108), denying network access to said electronic device and ending the method;
   d) receiving from the electronic device an identifier of the user and a password for said user in one or more OSI model layer 2 messages;
   e) if said identifier of the user is registered in the internal database as an identifier of a denied user (107), denying network access and ending the method, otherwise, proceeding to step f);
   f) authenticating the user, performing at least the following verifications:
   f1) verifying that the identifier of the user is registered in the internal database as an identifier of an authorized user and if the received password corresponds to the one linked to said user in the internal database (204);
   f2) verifying that the identifier of the electronic device is in the internal database (310) as linked to said user;
   g) if any of the verifications performed in the authentication steps is negative, storing the identification of the user in the internal database as a denied user, denying network access to said user and ending the method; otherwise proceeding to step h);
   h) if a layer 2 message requesting network configuration parameters is received from the electronic device, verifying if the electronic device is registered in the internal database as an electronic device allowed to access the network; if so, proceeding to step i), and otherwise, storing the identification of the electronic device as an denied electronic device, denying network access and ending the method;
   i) if the verification of step h) is positive, assigning a set of network configuration parameters to the electronic device depending at least on the identifier of the electronic device and sending said set of network configuration parameters to the electronic device.

2. The method according to claim 1, where the user authentication step further comprises the following authentication steps after step f2) and before step g):
   f3) obtaining the date and/or time when the access is taking place and verifying that said date and/or time is within the allowed times of access for said user and/or for said electronic device stored in the internal database;
   f4) verifying that the network access requested by the user is allowed by the security policies (416) defined for said user stored in the internal database.

3. The method according to claim 2, where a step of assigning a first access profile to the user is performed after step f2), based at least on information stored in the internal database for said user and where the security policies and/or the allowed times of access for said user will depend at least on the profile that has been assigned thereto.

4. The method according to claim 2, where the step of verifying that network access is allowed by the security policies in step f4), comprises:
verifying that the addressee and/or the web page and/or the service and/or the port that said user wishes to access according to the access request received, is allowed in the security policies defined for said user stored in the internal database.

5. The method according to claim 2, where the user's age is calculated after step f2) based at least on information stored in the internal database and if the user is underage, allowed times of access specific for underage users are applied in step f3) and the access to certain web pages is restricted according to the user's age.

6. The method according to claim 5, where if the user is underage the following actions are performed after step f2):
rating the user in a given category according to the user's age;
verifying if the web page the user wishes to access is rated as accessible for said category in which the user has been rated and if it is not rated as accessible, denying access and ending the method; where an analysis of the semantics content of said web page is performed for rating a web page as accessible.

7. The method according to claim 1 which further comprises:
j) periodically obtaining the location of the network element;
k) comparing said location with the previously obtained location and if it does not coincide, blocking the network access to the network element.

8. The method according to claim 1, where step i) comprises:
i1) assigning a second access profile obtained from the internal database to the electronic device depending on the identifier of said electronic device;
i2) assigning a set of network configuration parameters to the electronic device depending on the second access profile assigned thereto, said set of network configuration parameters including a network address for the electronic device, where said network address belongs to a range of network addresses available for the electronic device depending on the second access profile assigned thereto;
i3) sending a layer 2 message to the electronic device with the network configuration parameters assigned to the electronic device.

9. The method according to claim 8, where the second profile assigned in step i1) will depend at least on if the electronic device is infected with a virus and on if the antivirus version installed in the electronic device is correct, and where the method further comprises:
l) receiving information about the antivirus of the electronic device, where said information includes if the electronic device is infected with a virus and/or if the antivirus version installed in the electronic device is correct;
m) if the information about the antivirus of the electronic device has changed, changing the second profile assigned to the electronic device in step i1) and, therefore, the range of network addresses available for same.

10. The method according to claim 1, where to allow network access, the network element requests user information from the user and if the user does not provide said information, the network element denies network access; where this user information includes at least one of the following parameters: full name of the user, mailing address, ID number, passport number, date of birth and all the information concerning the user that is in the internal database, the network element sends said information to a database external to the network element.

11. The method according to claim 1, where communication between the electronic device and the network element is carried out in step i) using Dynamic Host Configuration Protocol (DHCP) protocol messages.

12. The method according to claim 1, where the identifier of the electronic device is at least one of the following: the Media Access Control (MAC), address of the electronic device, International Mobile Equipment Identity (IMEI), International Mobile Subscriber Identity (IMSI), Mobile Station International Subscriber Directory Number (MSISDN) or any other parameter identifying the electronic device and where the network element is a router.

13. The method according to claim 1, where the electronic device wishes to access the network through a given port and which further comprises:
if the electronic device's access is denied in step b) or c), closing the port through which the electronic device wishes to access, and if the electronic device's access is not denied in steps b) and c) and the port through which the electronic device wishes to access the network is closed, automatically opening the port.

14. A non-transitory digital storage medium for storing a computer program comprising computer executable instructions causing a computer executing the program to implement the method according to claim 1.

15. A network element for the improved access of a user (101) to a communications network using an electronic device (102), where the network element performs the network access control in the Open Systems Interconnection (OSI) model layer 2 and it is a router or switch which manages access to the communications network and where the network element comprises:
a database comprising:
a table of identifiers of electronic devices with denied network access (108) and a table of identifiers of users with denied network access (107), a table of identifiers of authorized users including the password linked to each user (204), a table of identifiers of those electronic devices having authorized network access (104), a table of identifiers of the user that are linked to each identifier of the electronic device with authorized network access (310) and a table with the set of network configuration parameters available for each identifier of the electronic device with authorized network access, where the set of available network configuration parameters comprises a range of network addresses available for each profile;
means for receiving from the electronic device a network access request, an identifier of the electronic device, an identifier of the user and a password for said user by means of one or more OSI model layer 2 messages;
means for receiving from the electronic device an OSI model layer 2 message, requesting network configuration parameters for accessing the network;

a processor configured for:

verifying if said identifier of the electronic device is in the table of electronic devices with denied network access (108) and if so, denying network access to said electronic device;

verifying if the identifier of the electronic device is registered in the table of identifiers of those electronic devices having authorized network access (104), if the verification is negative, denying network access and storing the identification of the electronic device in the table of electronic devices with denied network access (108);

verifying if said identifier of the user is in the table of users with denied network access (107) and if so, denying network access to said user;

authenticating the user, performing at least the following verifications:

verifying that the identifier of the user is in the table of authorized users (204) and the received password corresponds to the one linked to said user in said table;

verifying that the identifier of the electronic device is in the database as linked to said user;

if any of the authentication verifications is negative, storing the identification of the user in the table of users with denied network access and denying network access to said user;

when receiving from the electronic device the message requesting network configuration parameters, verifying if the identifier of the electronic device is registered in the table of identifiers of those electronic devices having authorized network access, if the verification is negative, storing the identification of the electronic device in the table of devices with denied network access (108) and denying said electronic device's network access, and if the verification is positive, assigning a set of network configuration parameters to the electronic device depending at least on the identifier of the electronic device;

means for sending a layer 2 message to the electronic device with the network configuration parameters assigned to the electronic device.

* * * * *